United States Patent
Gadbut et al.

(10) Patent No.: US 7,818,202 B1
(45) Date of Patent: Oct. 19, 2010

(54) VERTICALIZED AUTOMATED CUSTOMER ACQUISITION

(75) Inventors: Albert Gadbut, San Francisco, CA (US); Dmitriy Dvoskin, San Jose, CA (US)

(73) Assignee: Acquireweb, Inc., Foster City, CA (US)

( * ) Notice: Subject to any disclaimer, the term of this patent is extended or adjusted under 35 U.S.C. 154(b) by 562 days.

(21) Appl. No.: 11/800,429

(22) Filed: May 4, 2007

(51) Int. Cl.
G06F 17/00 (2006.01)
(52) U.S. Cl. .................................................. 705/10
(58) Field of Classification Search .................. 705/10
See application file for complete search history.

(56) References Cited

U.S. PATENT DOCUMENTS 6,735,572 B2 * 5/2004 Landesmann ................. 705/14
7,240,020 B2 * 7/2007 Poage et al. ................... 705/10

FOREIGN PATENT DOCUMENTS

KR 2003063570 * 7/2003

OTHER PUBLICATIONS

No author; Web Shoppers Turn Concept of Permission Marketing Into Reality as Means of Cutting Through the Clutter; Sep. 15, 1999; Business Wire; 4 pages.*

Opt-In-Email Puts a New Face on Push Web users invidet to sign up for target delivery of news (and maybe an ad); Apr. 9, 2001; NewsInc, v13, n8, pNA; 5 pages.*

Latham, Steve, "Leveraging the Web to Grow Your Business, Part One in a Series: Attracting Prospects," Spur Digital, Jun. 2003, 11 pages.

* cited by examiner

Primary Examiner—Thomas Dixon
(74) Attorney, Agent, or Firm—Nixon Peabody LLP

(57) ABSTRACT

Customer acquisition by a marketer includes determining one or more attributes of a target audience, identifying one or more subscriptions comprising a predetermined number of individuals having the attributes, requesting from each of the individuals permission to send one or more offers, receiving one or more acceptances from at least one of the individuals responsive to the requesting, and sending the one or more offers to individuals from whom acceptances were received.

80 Claims, 25 Drawing Sheets

VERTICALIZED AUTOMATED CUSTOMER ACQUISITION

FIELD OF THE INVENTION

The present invention relates to the field of computer science. More particularly, the present invention relates to customer acquisition.

BACKGROUND OF THE INVENTION

Marketers commonly use email marketing as an online customer retention tool. Such tools are typically used in an effort to keep existing customers and have them buy the Marketer's services or products again. Emails are sent to existing customers to inform them of new developments or new offers regarding the Marketer's products or services. The emails often include a URL that the customer may click on, whereupon the customer is directed to a "landing page" that contains details regarding the Marketer's new developments or offers. The actual email sending software keeps track of the number of times customers click on the URL. Some solutions also examine the buying behavior of existing customers to generate customer profiles in an attempt to create marketing programs that target existing customers more effectively. However, online customer retention tools focus on keeping existing customers, not on acquiring new customers.

Other solutions include sending large numbers of unsolicited emails (spam) to potential customers. Such solutions indiscriminately target anyone with an email address. The unsolicited emails are often caught by spam filters, in which case the potential customer never sees the emails. And unsolicited emails that make it through spam filters are routinely deleted by the recipient without further examination. For these reasons, unsolicited emails are typically ineffective as customer acquisition tools. Accordingly, a need exists for an improved solution for customer acquisition.

SUMMARY OF THE INVENTION

Customer acquisition by a marketer includes determining one or more attributes of a target audience, identifying one or more subscriptions comprising a predetermined number of individuals having the attributes, requesting from each of the individuals permission to send one or more offers, receiving one or more acceptances from at least one of the individuals responsive to the requesting, and sending the one or more offers to individuals from whom acceptances were received.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1:
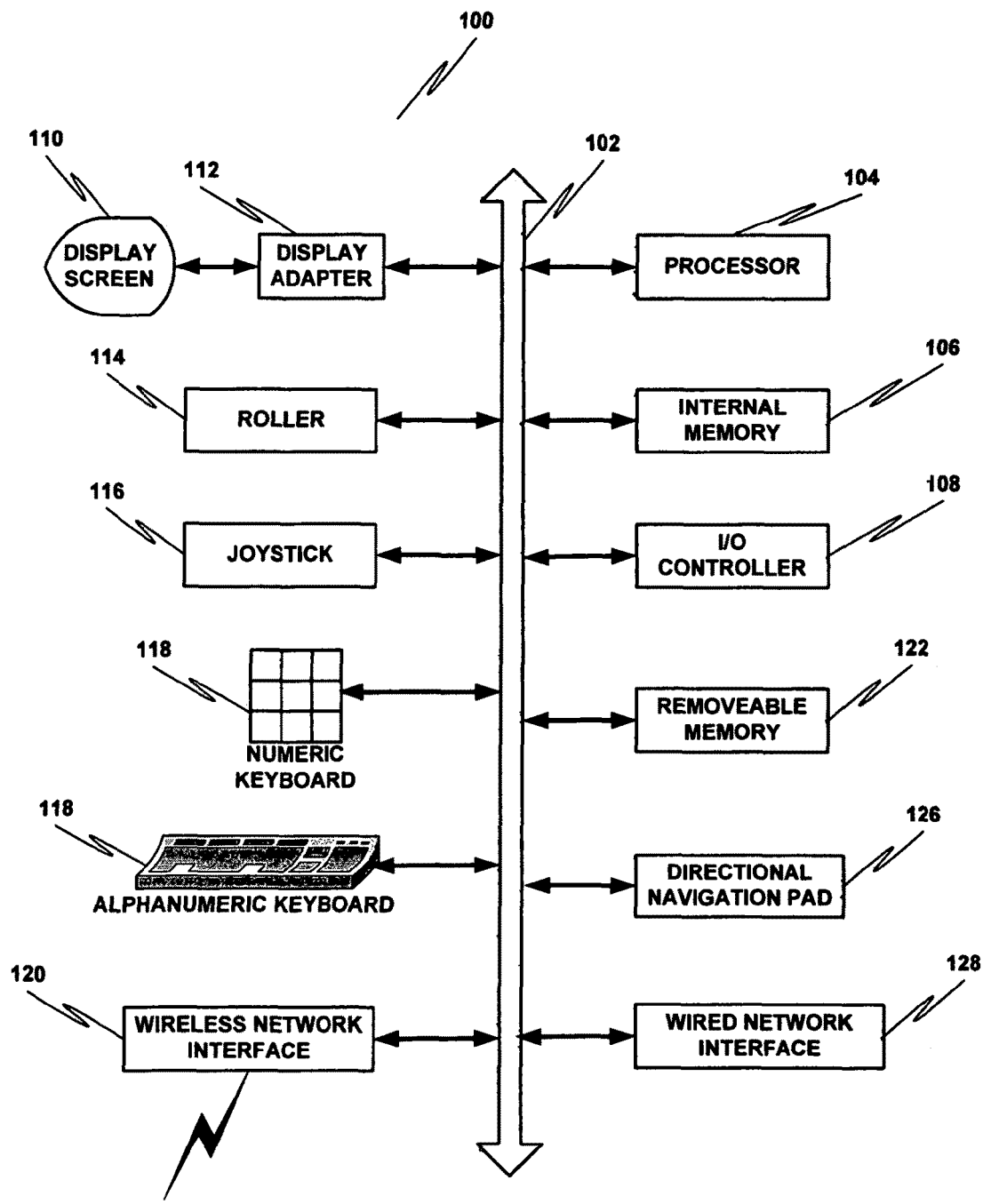
FIG. 1 is a block diagram of a computer system suitable for implementing aspects of the present invention.

Embodiments of the present invention are described herein in the context of a method and apparatus for customer acquisition. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

According to one embodiment of the present invention, the components, process steps, and/or data structures may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, connections and networks, data stores, or a stand-alone device. The process can be implemented as instructions executed by such hardware, hardware alone, or any combination thereof. The software may be stored on a program storage device readable by a machine.

According to one embodiment of the present invention, the components, processes and/or data structures may be implemented using machine language, assembler, C or C++, Java and/or other high level language programs running on a data processing computer such as a personal computer, workstation computer, mainframe computer, or high performance server running an OS such as Solaris® available from Sun Microsystems, Inc. of Santa Clara, Calif., Windows Vista™, Windows NT®, Windows XP, Windows XP PRO, and Windows® 2000, available from Microsoft Corporation of Redmond, Wash., Apple OS X-based systems, available from Apple Inc. of Cupertino, Calif., or various versions of the Unix operating system such as Linux available from a number of vendors. The method may also be implemented on a multiple-processor system, or in a computing environment including various peripherals such as input devices, output devices, displays, pointing devices, memories, storage devices, media interfaces for transferring data to and from the processor(s), and the like. In addition, such a computer system or computing environment may be networked locally, or over the Internet or other networks. Different implementations may be used and may include other types of operating systems, computing platforms, computer programs, firmware, computer languages and/or general-purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

In the context of the present invention, the term "network" includes local area networks, wide area networks, metro area networks, residential networks, corporate networks, internetworks, the Internet, the World Wide Web, cable television systems, telephone systems, wireless telecommunications systems, fiber optic networks, token ring networks, Ethernet networks, ATM networks, frame relay networks, satellite communications systems, and the like. Such networks are well known in the art and consequently are not further described here.

In the context of the present invention, the term "identifier" describes an ordered series of one or more numbers, characters, symbols, or the like. More generally, an "identifier" describes any entity that can be represented by one or more bits.

In the context of the present invention, the term "processor" describes a physical computer (either stand-alone or distributed) or a virtual machine (either stand-alone or distributed) that processes or transforms data. The processor may be implemented in hardware, software, firmware, or a combination thereof.

In the context of the present invention, the term "data stores" describes a hardware and/or software means or apparatus, either local or distributed, for storing digital or analog information or data. The term "Data store" describes, by way of example, any such devices as random access memory (RAM), read-only memory (ROM), dynamic random access memory (DRAM), static dynamic random access memory (SDRAM), Flash memory, hard drives, disk drives, floppy drives, tape drives, CD drives, DVD drives, magnetic tape devices (audio, visual, analog, digital, or a combination thereof), optical storage devices, electrically erasable programmable read-only memory (EEPROM), solid state memory devices and Universal Serial Bus (USB) storage devices, and the like. The term "Data store" also describes, by way of example, databases, file systems, record systems, object oriented databases, relational databases, SQL databases, audit trails and logs, program memory, cache and buffers, and the like.

In the context of the present invention, the term "user interface" describes any device or group of devices for presenting and/or receiving information and/or directions to and/or from persons. A user interface may comprise a means to present information to persons, such as a visual display projector or screen, a loudspeaker, a light or system of lights, a printer, a Braille device, a vibrating device, or the like. A user interface may also include a means to receive information or directions from persons, such as one or more or combinations of buttons, keys, levers, switches, knobs, touch pads, touch screens, microphones, speech detectors, motion detectors, cameras, and light detectors. Exemplary user interfaces comprise pagers, mobile phones, desktop computers, laptop computers, handheld and palm computers, personal digital assistants (PDAs), cathode-ray tubes (CRTs), keyboards, keypads, liquid crystal displays (LCDs), control panels, horns, sirens, alarms, printers, speakers, mouse devices, consoles, and speech recognition devices.

In the context of the present invention, the term "system" describes any computer information and/or control device, devices or network of devices, of hardware and/or software, comprising processor means, data storage means, program means, and/or user interface means, which is adapted to communicate with the embodiments of the present invention, via one or more data networks or connections, and is adapted for use in conjunction with the embodiments of the present invention.

FIG. 1 depicts a block diagram of a computer system 100 suitable for implementing aspects of the present invention. As shown in FIG. 1, system 100 includes a bus 102 which interconnects major subsystems such as a processor 104, an internal memory 106 (such as a RAM), an input/output (I/O) controller 108, a removable memory (such as a memory card) 122, an external device such as a display screen 110 via display adapter 112, a roller-type input device 114, a joystick 116, a numeric keyboard 118, an alphanumeric keyboard 118, directional navigation pad 126 and a wireless interface 120. Many other devices can be connected. Wireless network interface 120, wired network interface 128, or both, may be used to interface to a local or wide area network (such as the Internet) using any network interface system known to those skilled in the art.

Many other devices or subsystems (not shown) may be connected in a similar manner. Also, it is not necessary for all of the devices shown in FIG. 1 to be present to practice the present invention. Furthermore, the devices and subsystems may be interconnected in different ways from that shown in FIG. 1. Code to implement the present invention may be operably disposed in internal memory 106 or stored on storage media such as removable memory 122, a floppy disk, a thumb drive, a CompactFlash® storage device, a DVD-R ("Digital Versatile Disc" or "Digital Video Disc" recordable), a DVD-ROM ("Digital Versatile Disc" or "Digital Video Disc" read-only memory), a CD-R (Compact Disc-Recordable), or a CD-ROM (Compact Disc read-only memory).

Figure 2:
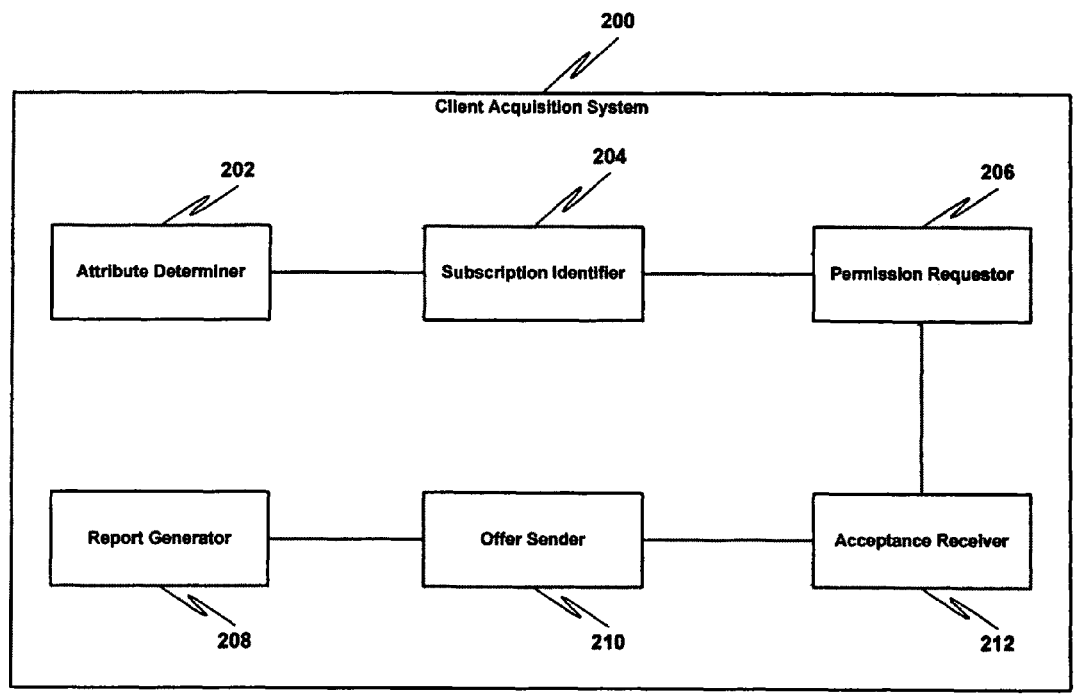
FIG. 2 is a block diagram that illustrates a system for customer acquisition in accordance with one embodiment of the present invention.

Turning now to FIG. 2, a block diagram that illustrates a system for customer acquisition in accordance with one embodiment of the present invention is presented. As shown in FIG. 2, customer acquisition system 200 comprises an attribute determiner 202, a subscription identifier 204, a permission requestor 206, an acceptance receiver 212, an offer sender 210, and a report generator 208. Attribute determiner 202 is configured to determine one or more attributes of a target audience. Subscription identifier 204 is coupled to attribute determiner 202 and is configured to identify one or more subscriptions comprising a predetermined number of individuals having the attributes. Permission requestor 206 is coupled to the subscription identifier 204 and is configured to request from each of the individuals, permission to send one or more offers. Acceptance receiver 212 is coupled to permission requestor 206 and is configured to receive one or more acceptances from at least one of the individuals in response to the requesting. Offer sender 210 is coupled to the acceptance receiver 212 and is configured to send the one or more offers to the individuals from whom an acceptance was received.

In operation, attribute determiner 202 determines one or more attributes of a target audience. Subscription identifier 204 identifies one or more subscriptions comprising a predetermined number of individuals having the attributes determined by attribute determiner 202. Permission requestor 206 requests from each of the individuals, permission to send one or more offers. Acceptance receiver 212 receives one or more acceptances from at least one of the individuals in response to the requesting of permission. Offer sender 210 sends the one or more offers to the individuals from whom an acceptance was received.

According to one embodiment of the present invention, subscription identifier 204 is further configured to exclude from the one or more subscriptions, all individuals previously identified by a different marketer, where the marketer and the different marketer belong to the same market vertical.

According to one embodiment of the present invention, the one or more attributes comprises a postal code that defines a geographic region. By way of example, the postal code may be a zip code.

According to one embodiments of the present invention, the one or more attributes of a client's target audience comprises one or of the following: a radius to a location, an age range, an income range, a gender, a number of automobiles, a credit score range, and a number of children. The foregoing list of example attributes is not intended to be exhaustive. Other attributes may be specified.

According to one embodiment of the present invention, the one or more offers comprise one or more emailed offers. According to another embodiment of the present invention, the one or more offers comprise one or more text messages. By way of example, the one or more offers may comprise one or more SMS (Short Message Service) text messages.

According to one embodiment of the present invention, the one or more offers comprises a landing page. The landing page may comprise a URL that when a user clicks on the URL, directs the URL to a webpage having information about an offer.

According to one embodiment of the present invention, customer acquisition system 200 further comprises a report generator 208 coupled to offer sender 210 and configured to generate one or more reports summarizing one or more results of the sending of a particular offer of a marketer. According to one embodiment of the present invention, the report comprises an identification of the number of delivered offers for different clients on a subscription level where the client sees only the results specific to their subscription or subscriptions.

According to another embodiment of the present invention, the report comprises an identification of the number of opened offers for different clients on a subscription level where the client sees only the results specific to their subscription or subscriptions. According to another embodiment of the present invention, the report comprises an identification of the number of unique opened offers for different clients on a subscription level where the client sees only the results specific to their subscription or subscriptions. The foregoing list of example report information is not intended to be exhaustive. Other information may be provided in a report.

According to one embodiment of the present invention, the report comprises an identification of the number of individuals that opted out from participating in an offer.

According to one embodiment of the present invention, the predetermined number of individuals is 20,000. The predetermined number of individuals may be any number.

According to one embodiment of the present invention, customer acquisition system 200 is further configured to, after sending offers to individuals identified by a client's subscription(s), identify a second one or more subscriptions comprising a predetermined number of individuals having the same attributes specified by the client. By way of example, a client may initially purchase two subscriptions, where each of the subscriptions includes the contact information for 20,000 individuals. The client may subsequently purchase an additional subscription for a total of three subscriptions (contact information for 60,000 individuals).

According to one embodiment of the present invention, customer acquisition system 200 is further configured to further to, after the identifying, prohibit the dropping of the one or more subscriptions.

Figure 3:
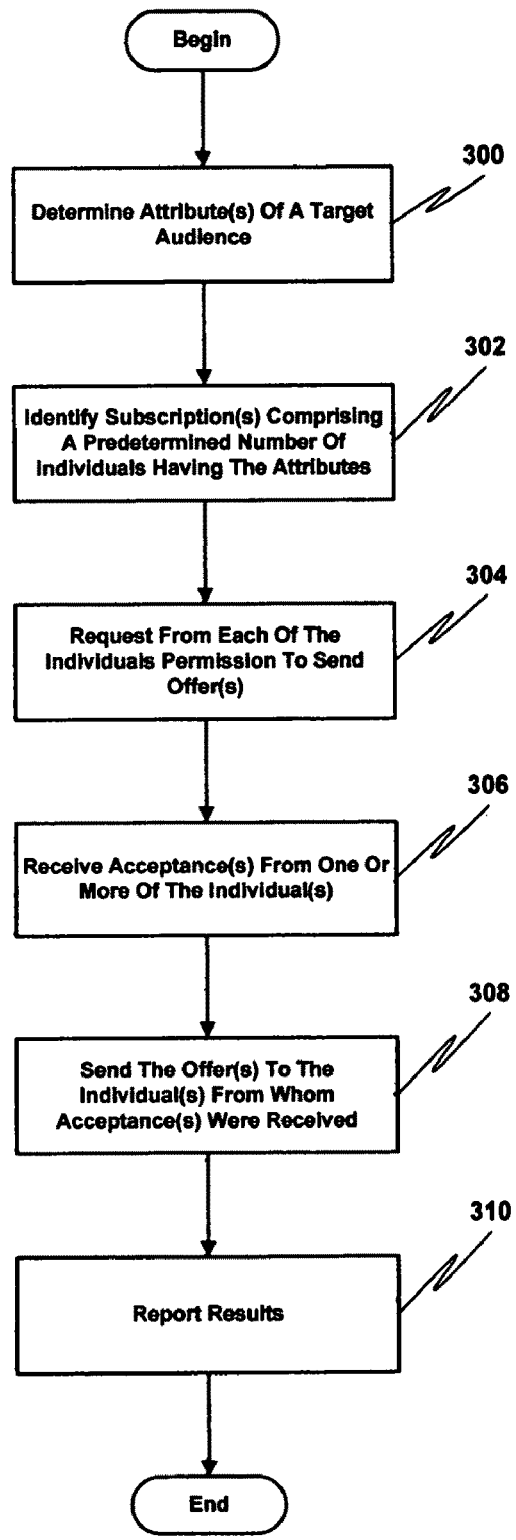
FIG. 3 is a flow diagram that illustrates a method for customer acquisition in accordance with one embodiment of the present invention.

Turning now to FIG. 3, a flow diagram that illustrates a method for customer acquisition in accordance with one embodiment of the present invention is presented. FIG. 3 corresponds to the system illustrated in FIG. 2. The processes illustrated in FIG. 3 may be implemented in hardware, software, firmware, or a combination thereof. At 300, one or more attributes of a target audience are determined. At 302, one or more subscriptions comprising a predetermined number of individuals having the attributes are identified. At 304, one or more requests are made from each of the individuals for permission to send one or more offers. At 306, one or more acceptances are received from at least one of the individuals in response to the requesting. At 308, the one or more offers are sent to the individuals from whom acceptances were received. At 310, the results of the sending the offers is reported.

In the context of the present invention, the term "market vertical" refers to all stages of a business, from production to distribution. Examples of market verticals include an "insurance" market vertical, a "utilities" market vertical, and an "automotive" market vertical. Example clients within the insurance market vertical could include State Farm, Allstate, and Geico. Example clients within the utilities marked vertical could include Edison Power, Pacific Gas & Electric, and San Jose Water Company. Example clients within the automotive market vertical could include Ford, General Motors, and Honda.

In the context of the present invention, the term "campaign" describes a series of offers sent to individuals identified by client subscriptions. Campaigns are specific to offers from clients within the same market vertical.

In the context of the present invention, the term "launch" refers to the initiation of a campaign.

In the context of the present invention, the term "template" describes a form specific to a vertical that provides a framework for an offer. By way of example, a template may indicate a particular format for the subject line of an emailed offer, or the text message included in the body of an emailed offer. A particular market vertical may have multiple templates.

Figure 4:
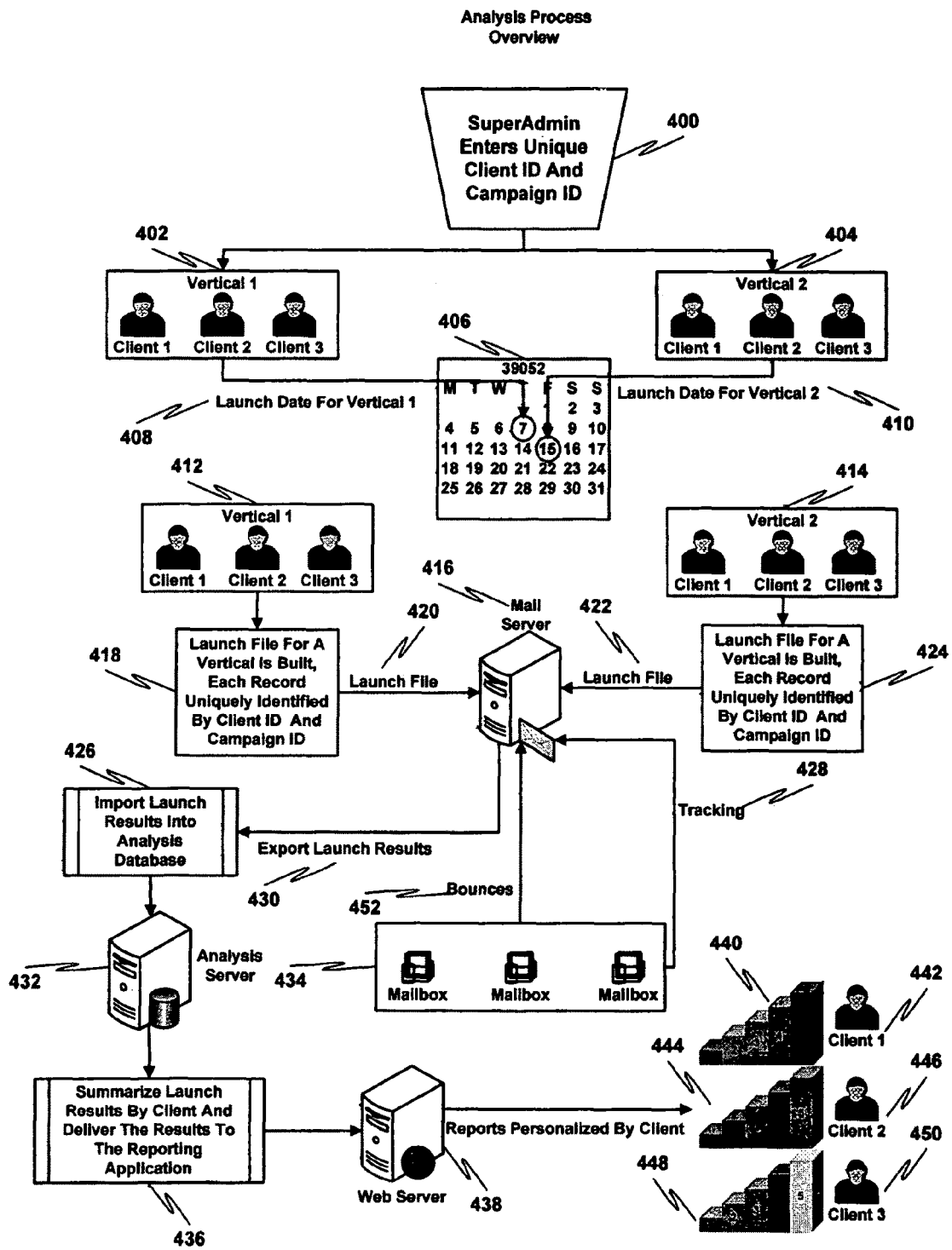
FIG. 4 is a block diagram that illustrates a system for customer acquisition in accordance with one embodiment of the present invention.

Turning now to FIG. 4, a block diagram that illustrates a system for customer acquisition in accordance with one embodiment of the present invention is presented. The processes illustrated in FIG. 4 may be implemented in hardware, software, firmware, or a combination thereof. As shown in FIG. 4, the launch date for clients assigned to market vertical 402 differs from the launch date for clients assigned to market vertical 404. Although three clients are illustrated in each of market vertical 402 and market vertical 404, there may be any number of clients within a particular market vertical included in a campaign.

Still referring to FIG. 4, each of the clients for market vertical 412 interfaces with the customer acquisition system to identify one or more subscriptions comprising a predetermined number of individuals having particular attributes. At 418 and 424, launch information for each client of a particular market vertical is combined to create a launch file (420, 422) for the market vertical. The launch information includes contact information for individuals identified by a client's subscription, who have agreed to receive offers from the respective clients. In the example illustrated by FIG. 4, a first launch file 420 comprises launch information for the clients assigned to market vertical 412, and launch file 422 comprises launch information for the clients assigned to market vertical 414. Each record in a launch file is tagged with a set of unique of IDs to allow reporting of launch results on a campaign, offer, and creative levels, for different clients where the client sees only the results specific to their subscription or subscriptions.

Launch files 420 and 422 are provided to mail server 416. Mail server 416 launches the campaign for each vertical on their respective launch dates 406, thereby sending offers to the individuals that have previously agreed to receive such offers. According to one embodiment of the present invention, the offers are emailed. Information regarding whether particular emails "bounce" or are otherwise returned undelivered are maintained by mail server 416. Tracking information regarding the sent emails is also maintained by mail server 416.

At 426, launch results for all the clients participating in a launch are imported into an analysis database. Analysis server 432 analyzes the launch results to provide reports summarizing the launch results, specific to particular clients on campaign, offer, and creative levels. The reports are sent to Web server 438 so that individual clients (442, 446, 450) may log on to the customer acquisition system via a user interface in communication with Web server 438 and view their reports (440, 444, 448).

Figure 5:
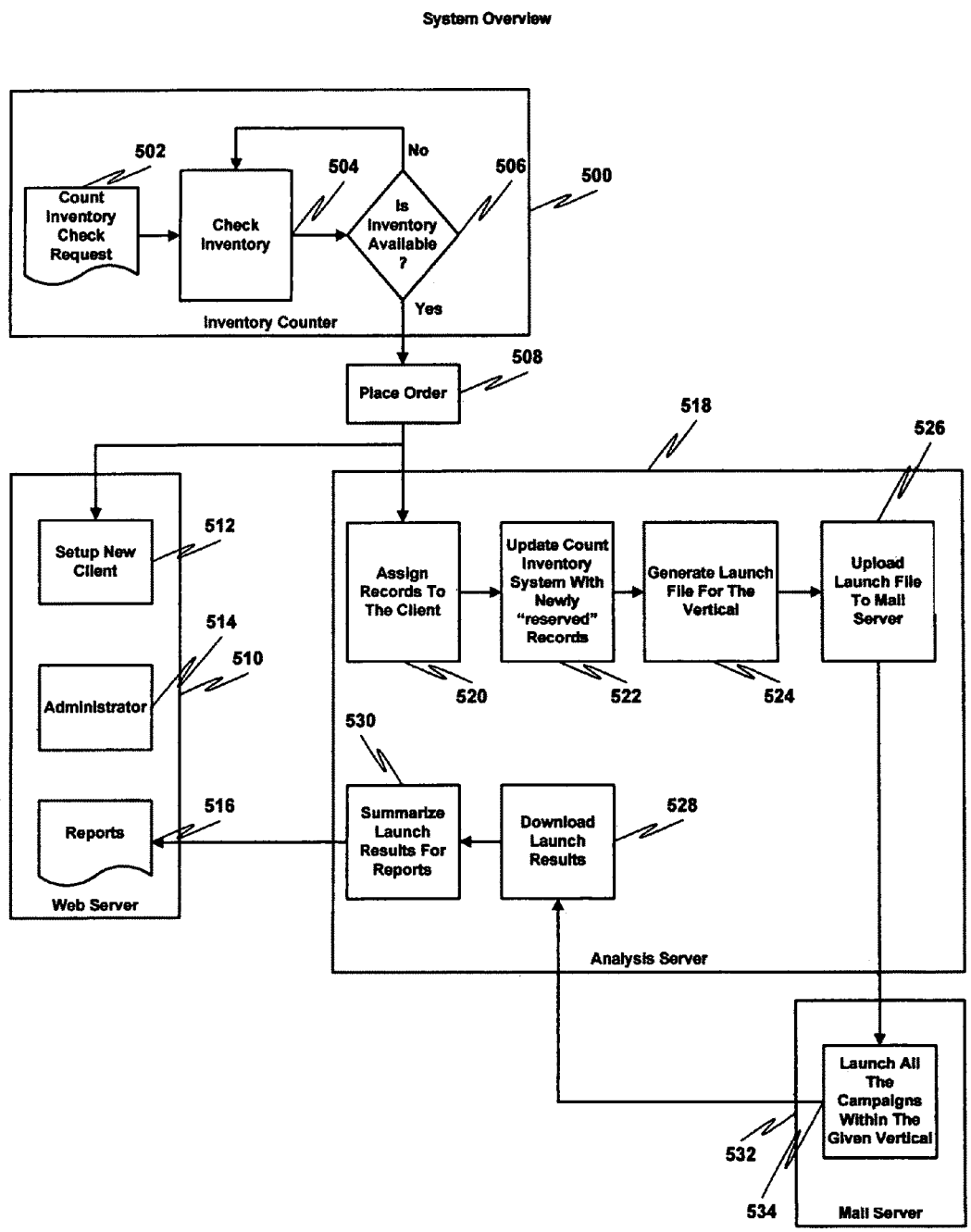
FIG. 5 is a block diagram that illustrates a system for customer acquisition in accordance with one embodiment of the present invention.

Turning now to FIG. 5, a block diagram that illustrates a system for customer acquisition in accordance with one embodiment of the present invention is presented. The processes illustrated in FIG. 5 may be implemented in hardware, software, firmware, or a combination thereof. FIG. 5 illustrates one of many possible architectures. A client sets up a campaign by interfacing with a user interface in communication with Web server 510 to identify one or more subscriptions comprising a predetermined number of individuals having particular attributes of the client's target audience. Inventory counter 500 checks the inventory of the customer acquisition system to determine whether there is sufficient inventory of individuals having the desired attributes. The client is informed whether there is sufficient inventory for at least one subscription. And if there is sufficient inventory, the client is informed of the number of available subscriptions. By way of example, if there are 20,000 individuals per subscription and there are 45,000 individuals having the desired attributes, the client is informed there are two subscriptions available for purchase.

Analysis server 518 assigns the records representing the individuals identified by the purchased subscriptions to the client (520). Inventory counter 500 is updated to reflect the "reserved" status of these records (522). Analysis server 518 generates the launch file for a particular market vertical (524), and uploads the launch file to mail server 532 (526). Mail server 532 receives the launch file and launches the campaigns within the market vertical associated with the launch file. Analysis server 518 downloads the launch results (528) and creates reports tailored to particular clients that summarizes the launch results. The reports are communicated to Web server 510 for viewing by the client(s).

According to one embodiment of the present invention, a client may set up and manage its own account on a customer acquisition system. Setup of a client account comprises determining attributes of the client's target audience, determining particular templates to use for a campaign, and purchasing a number of subscriptions. According to another embodiment of the present invention, an agent acts on behalf of one or more clients to set up and manage the client's account on the customer acquisition system. This is explained in more detail below, with reference to FIG. 6.

Figure 6:
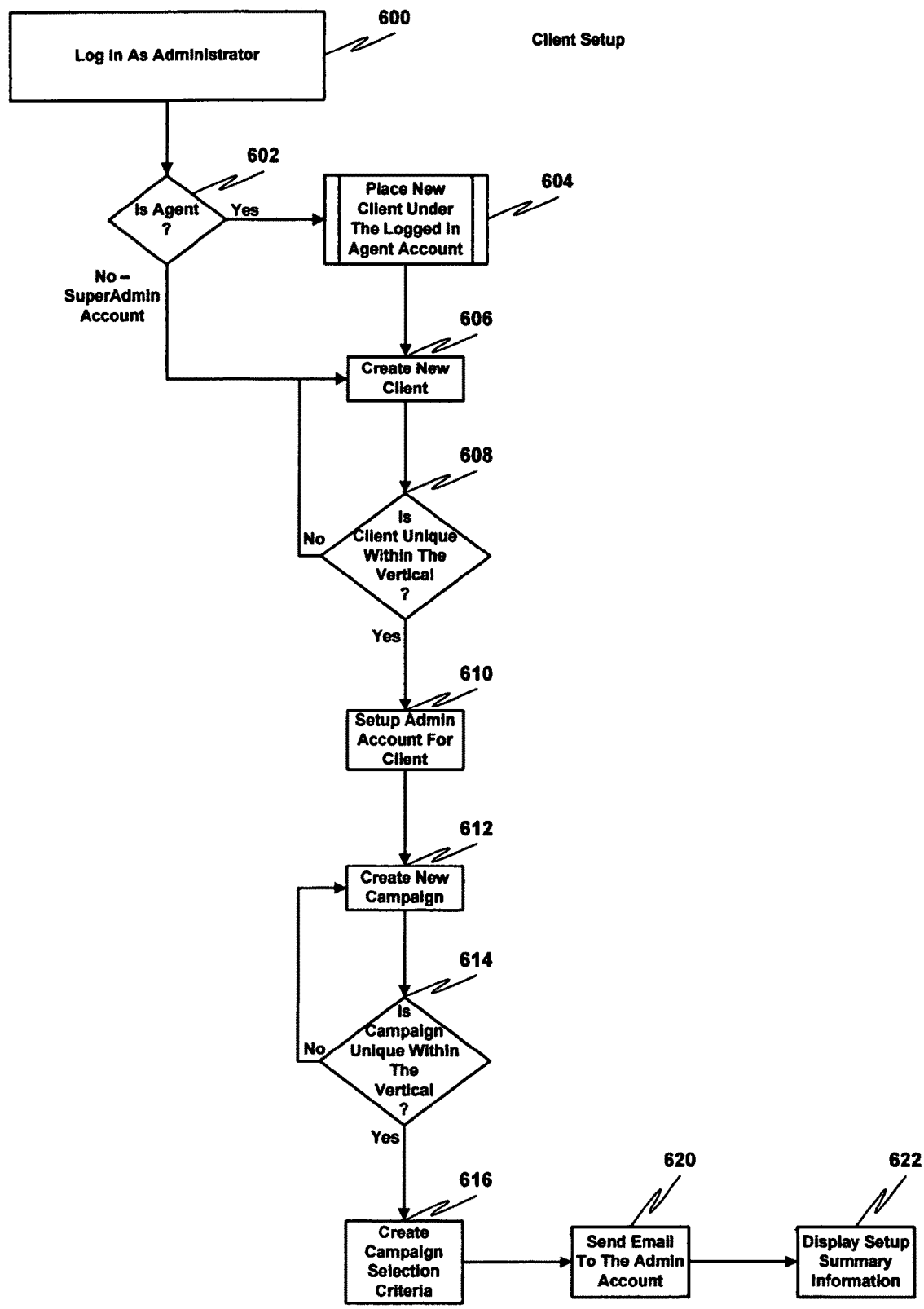
FIG. 6 is a flow diagram that illustrates a method for client setup for customer acquisition in accordance with one embodiment of the present invention.

Turning now to FIG. 6, a flow diagram that illustrates a method for client setup for customer acquisition in accordance with one embodiment of the present invention is presented. The processes illustrated in FIG. 6 may be implemented in hardware, software, firmware, or a combination thereof. At 602, a determination is made regarding whether account that has been logged in to is an agent account. If it is an agent account, an association between a new client and the agent is made at 606. If the client is unique within the particular market vertical, setup of an administrator's account for the client is performed at 610. At 612, a new campaign is created. At 614, a determination is made regarding whether the campaign is unique within the market vertical. If the campaign is unique within the market vertical, at 616 campaign selection criteria is created. At 620, an email is sent to the administrator's account. At 622, setup summary information is displayed.

According to one embodiment of the present invention, the attributes of a client's target audience comprise having proximity with a particular geographic area defined by a postal code. By way of example, a client may indicate an interest in individuals residing within the geographic area defined by the San Jose zip code 95113. According to another embodiment of the present invention, the attributes of a client's target audience comprise being within a radius of a particular location. By way of example, an automobile dealership may indicate an interest in individuals residing within ten miles of the dealership, or within ten miles of the geographic area defined by the dealership's zip code. This is explained in more detail below, with reference to FIG. 7.

Figure 7:
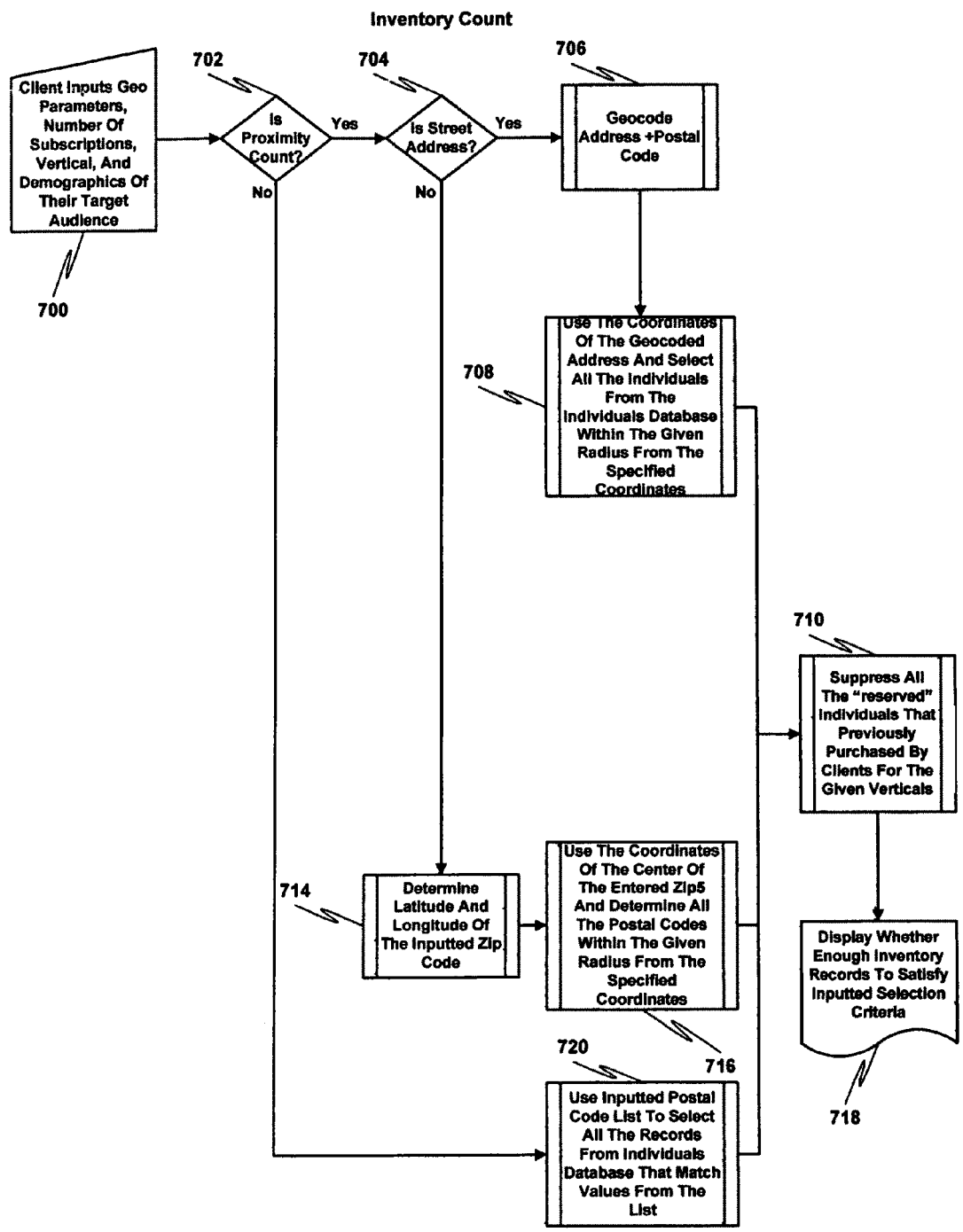
FIG. 7 is a flow diagram that illustrates a method for counting inventory during client setup for customer acquisition in accordance with one embodiment of the present invention.

Turning now to FIG. 7, a flow diagram that illustrates a method for counting inventory during client setup for customer acquisition in accordance with one embodiment of the present invention is presented. FIG. 7 provides more detail for reference numeral 504 of FIG. 5. The processes illustrated in FIG. 7 may be implemented in hardware, software, firmware, or a combination thereof. At 700, a client indicates geographical parameters, a number of subscriptions, a market vertical, and demographics of the client's target audience. At 702, a determination is made regarding whether the information from the client includes the selection of individuals within one or more geographic areas defined by a postal code. According to one embodiment of the present invention, the postal code comprises a zip code. If the information from the client includes the selection of individuals within one or more geographic areas defined by a postal code, at 720 the postal code list provided by the client is used to select all the records from the individuals database that match at least one of the postal codes.

If the information from the client indicates the selection of individuals within a radius of a geographic area, at 704 a determination is made regarding whether the geographic area is a street address. If the geographic area is a street address, at 706 the address is geocoded to provide a specific latitude and longitude for the street address. According to one embodiment of the present invention, the geographic area is geocoded using the Yahoo geocoding service, available from Yahoo! Inc. of Sunnyvale, Calif. At 708, the coordinates of the geocoded address is used to select all the individuals that are within the radius from the specified coordinates.

If at 704 a determination is made regarding whether the geographic are is a street address. If the geographic area is not a street address, at 717 the latitude and longitude of the postal zip code is determined. At 716, the coordinates of the center of the entered postal code is used to determine all the postal codes within the radius from the specified coordinates. At 708, the coordinates of the geocoded address is used to select all the individuals from the individuals database that are within the radius from the specified coordinates.

At 710, display of the "reserved" individuals whose contact information was previously purchased by clients is suppressed. At 718, a display is rendered regarding whether there are enough records in inventory to satisfy the inputted selection criteria.

Figure 8:
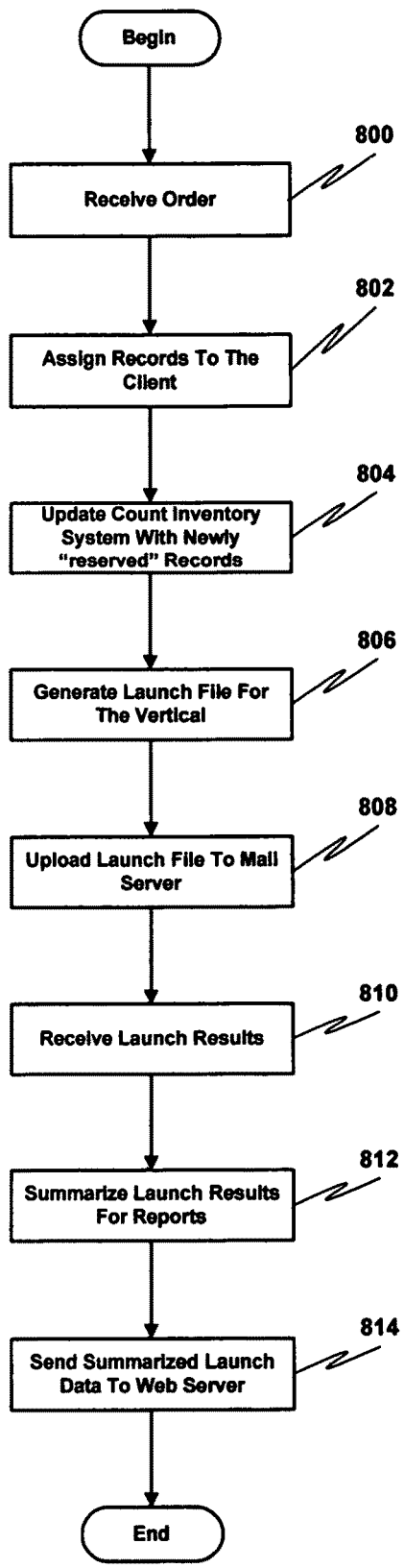
FIG. 8 is a flow diagram that illustrates a method for customer acquisition from the perspective of an analysis server in accordance with one embodiment of the present invention.

Turning now to FIG. 8, a flow diagram that illustrates a method for customer acquisition from the perspective of an analysis server in accordance with one embodiment of the present invention is presented. The processes illustrated in FIG. 8 may be implemented in hardware, software, firmware, or a combination thereof. FIG. 8 corresponds with analysis server 518 of FIG. 5. At 800, an order for a particular subscription is received. At 802, records of the contact information of individuals identified by the subscription are assigned to the client. At 804, the count inventory system is updated with newly "reserved" records. At 806, a launch file for the vertical is generated. At 808, the launch file for the vertical is uploaded to the mail server. At 810, launch results are received. At 812, the launch results are summarized for individualized reporting to the Client. At 814, the summarized launch data is sent to the Web server for viewing by clients.

Figure 9:
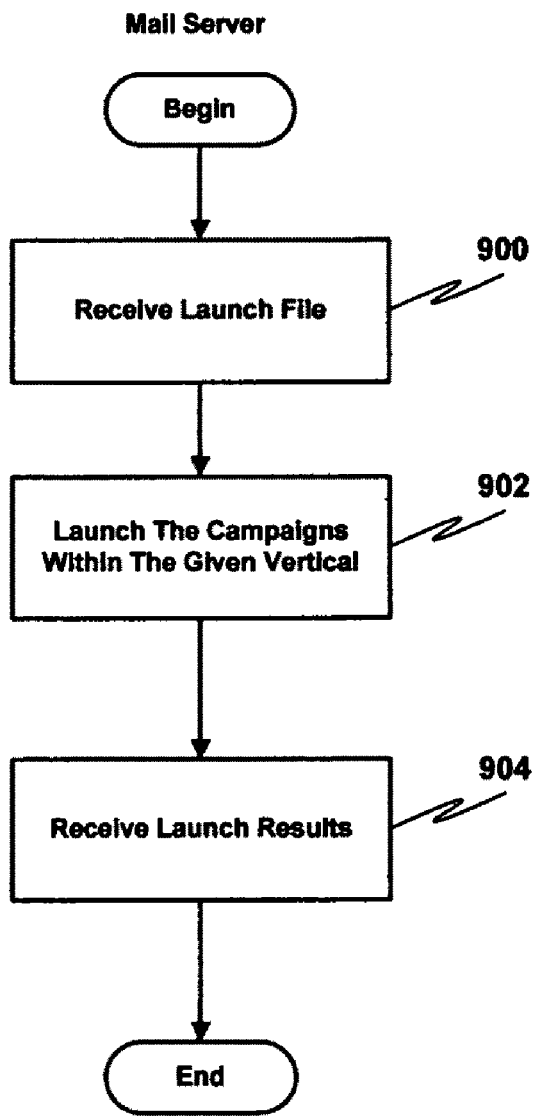
FIG. 9 is a flow diagram that illustrates a method for customer acquisition from the perspective of a mail server in accordance with one embodiment of the present invention.

Turning now to FIG. 9, a flow diagram that illustrates a method for customer acquisition from the perspective of a mail server in accordance with one embodiment of the present invention is presented. The processes illustrated in FIG. 9 may be implemented in hardware, software, firmware, or a combination thereof. FIG. 9 corresponds with mail server 532 of FIG. 5. At 900, a launch file is received. At 902, the campaigns within the market vertical are launched. At 904, launch results are received.

FIGS. 10-25 are screen shots that illustrate a user interface for customer acquisition, in accordance with example embodiments of the present invention.

Figure 10:
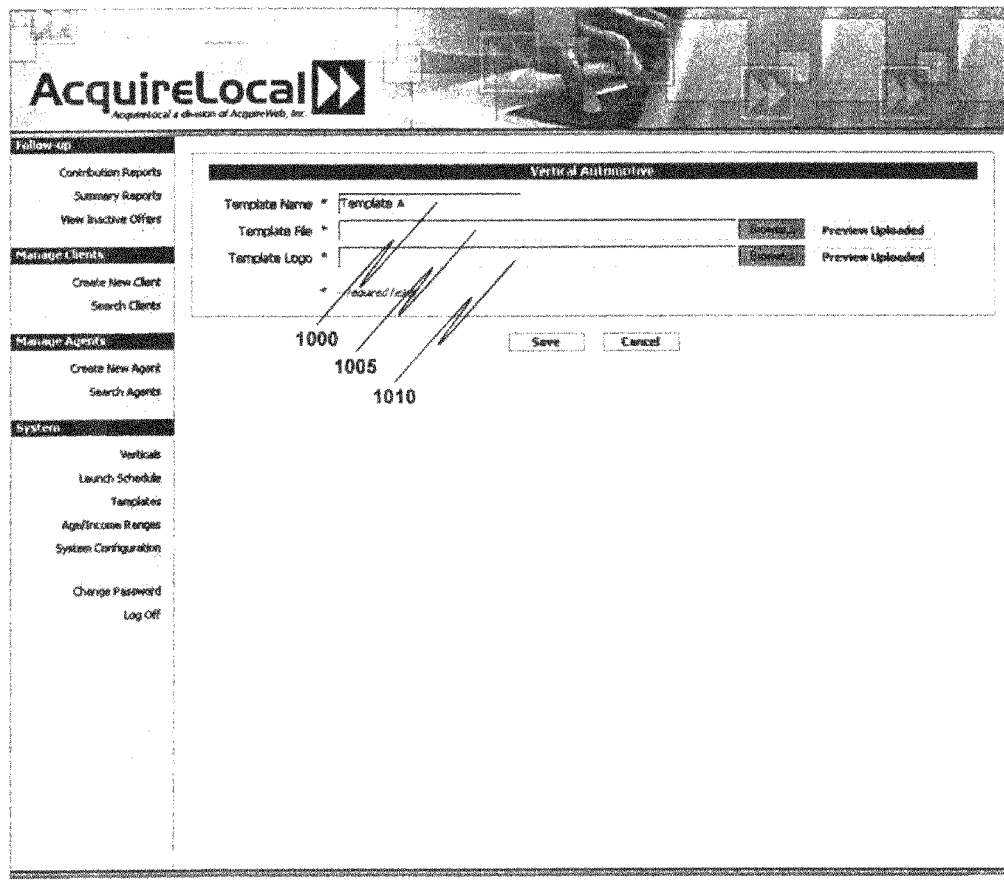
FIG. 10 is a screen shot that illustrates a user interface for customer acquisition, showing a of template setup in accordance with one embodiment of the present invention.

FIG. 10 is a screen shot that illustrates a user interface for customer acquisition, showing a of template setup in accordance with one embodiment of the present invention. Field 1000 indicates a template name. Field 1005 indicates the location of a file containing the template. Field 1010 indicates a file containing a logo associated with the template. As shown in FIG. 10, the user may preview an uploaded template file or template logo.

Figure 11:
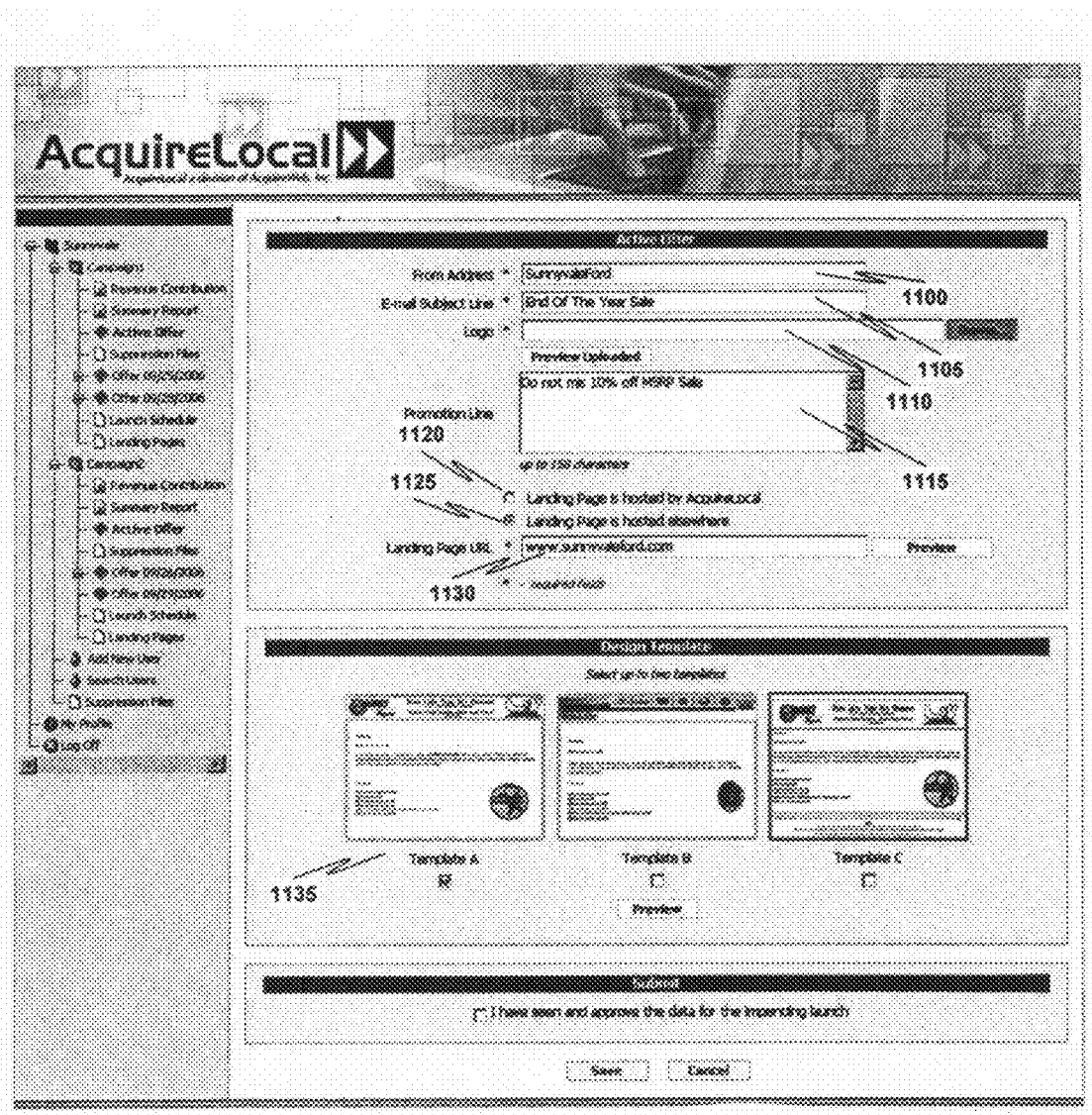
FIG. 11 is a screen shot that illustrates a user interface for customer acquisition, showing data for an impending launch in accordance with one embodiment of the present invention.

FIG. 11 is a screen shot that illustrates a user interface for customer acquisition, showing data for an impending launch in accordance with one embodiment of the present invention. Field 1100 indicates the "From" address to appear in emails based on a particular active offer. Field 1105 indicates the text to appear in the subject line of emails based on the active offer. Field 1110 indicates a logo to appear in emails based on a particular active offer. Field 1115 indicates the text of a promotion line to appear in emails based the active offer. Field 1120 indicates whether the landing page associated with the offer is hosted by a particular entity ("AcquireLocal" in this example). Field 1125 indicates whether the landing page associated with the offer is hosted by an entity other than the entity indicated in Field 1120. Field 1130 indicates the URL of the landing page associated with the active offer. Field 1135 indicates which of a predetermined number of design templates will be associated with the active offer.

Figure 12:
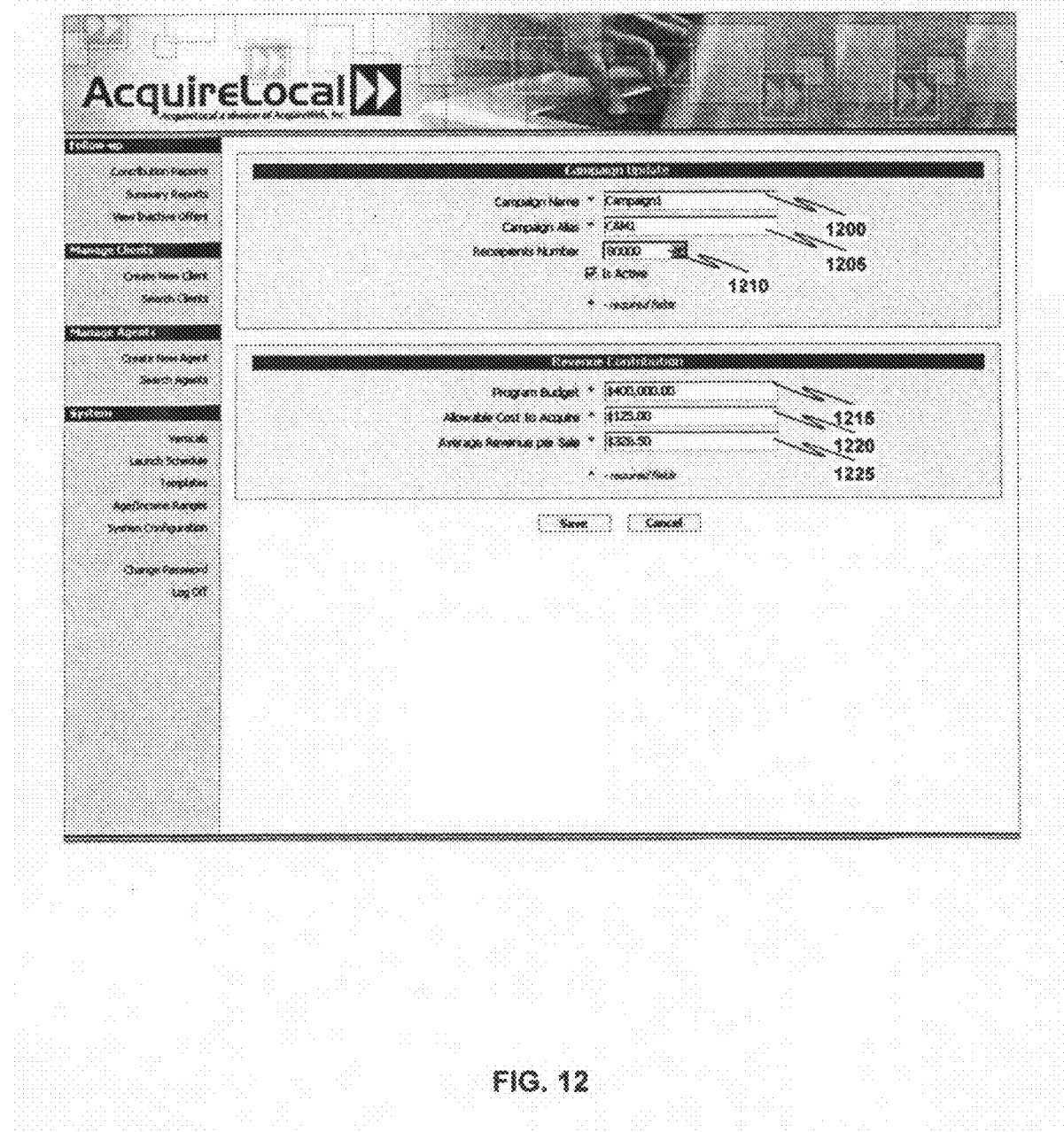
FIG. 12 is a screen shot that illustrates a user interface for customer acquisition, showing a campaign update in accordance with one embodiment of the present invention.

FIG. 12 is a screen shot that illustrates a user interface for customer acquisition, showing a campaign update in accordance with one embodiment of the present invention. Field 1200 indicates the name of a campaign. Field 1205 indicates an alias for the campaign indicated in Field 1200. Field 1210 indicates the number of recipients for the campaign. Field 1215 indicates a budget for the campaign. Field 1220 indicates an allowable cost to acquire a particular customer. Field 1225 indicates the average revenue per sale to a customer.

Figure 13:
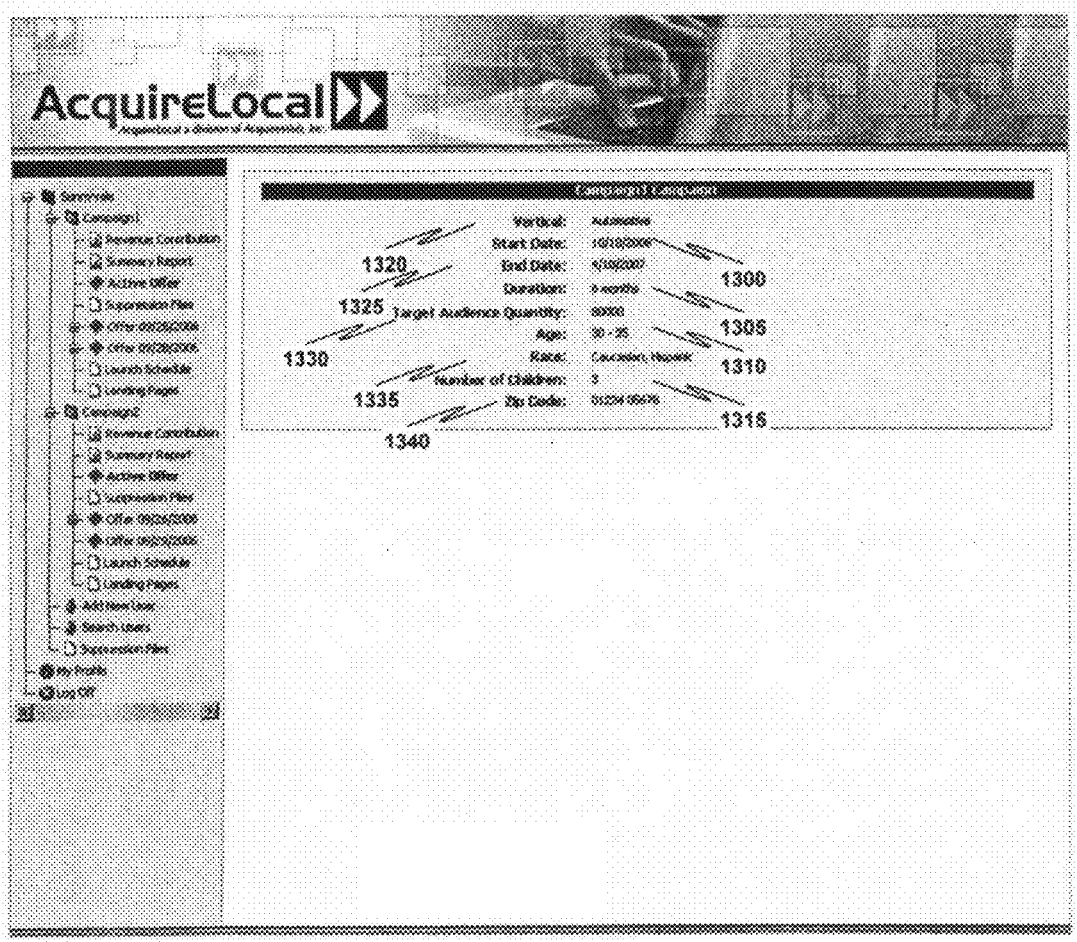
FIG. 13 is a screen shot that illustrates a user interface for customer acquisition, showing campaign information in accordance with one embodiment of the present invention.

FIG. 13 is a screen shot that illustrates a user interface for customer acquisition, showing campaign information in accordance with one embodiment of the present invention. Field 1320 indicates the market vertical of the campaign. Field 1300 indicates the start date of the campaign. Field 1325 indicates the end date of the campaign. Field 1305 indicates the duration of the campaign. Field 1330 indicates the quantity of customers in the target audience. Field 1310 indicates the age range of individuals in the target audience. Field 1335 indicates the race of individuals in the target audience. Field 1315 indicates the number of children of individuals in the target audience. Field 1340 indicates the postal code of individuals in the target audience.

Figure 14:
FIG. 14 is a screen shot that illustrates a user interface for customer acquisition, showing client information in accordance with one embodiment of the present invention.

FIG. 14 is a screen shot that illustrates a user interface for customer acquisition, showing client information in accordance with one embodiment of the present invention. Client contact information area 1400 indicates contact information for a particular client. In the example shown, contact information for a store manager, and the location of the store is indicated. Billing information area 1405 indicates client contact information for billing purposes, if it is different than the information provided at 1400. Sales person contact information are 1410 indicates contact information for a sales person associated with the sales manager and store indicated at 1400.

Figure 15:
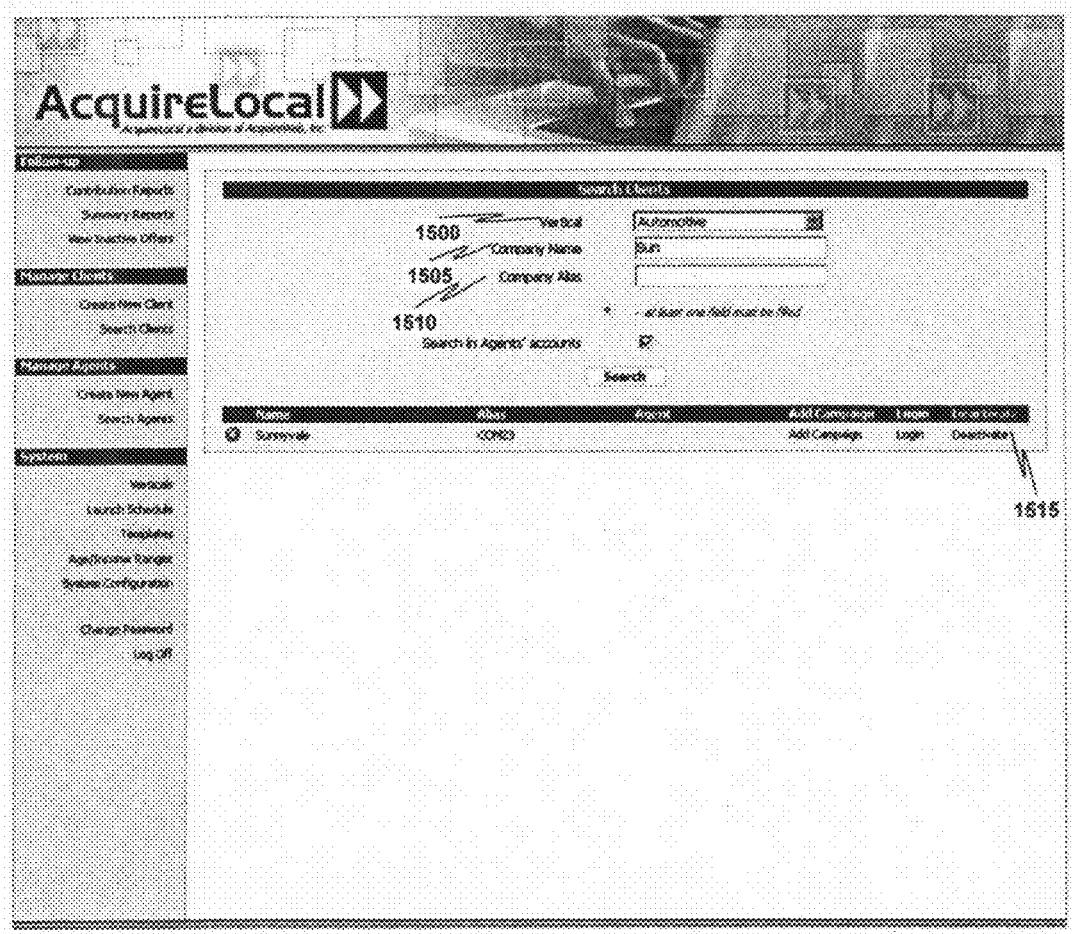
FIG. 15 is a screen shot that illustrates a user interface for customer acquisition, showing a client search in accordance with one embodiment of the present invention.

FIG. 15 is a screen shot that illustrates a user interface for customer acquisition, showing a client search in accordance with one embodiment of the present invention. Field 1500 indicates a market vertical associated with the client. Field 1505 indicates the company name of the client. Field 1510 indicates an alias associated with the company indicated at 1505. Search results are shown at 1515.

Figure 16:
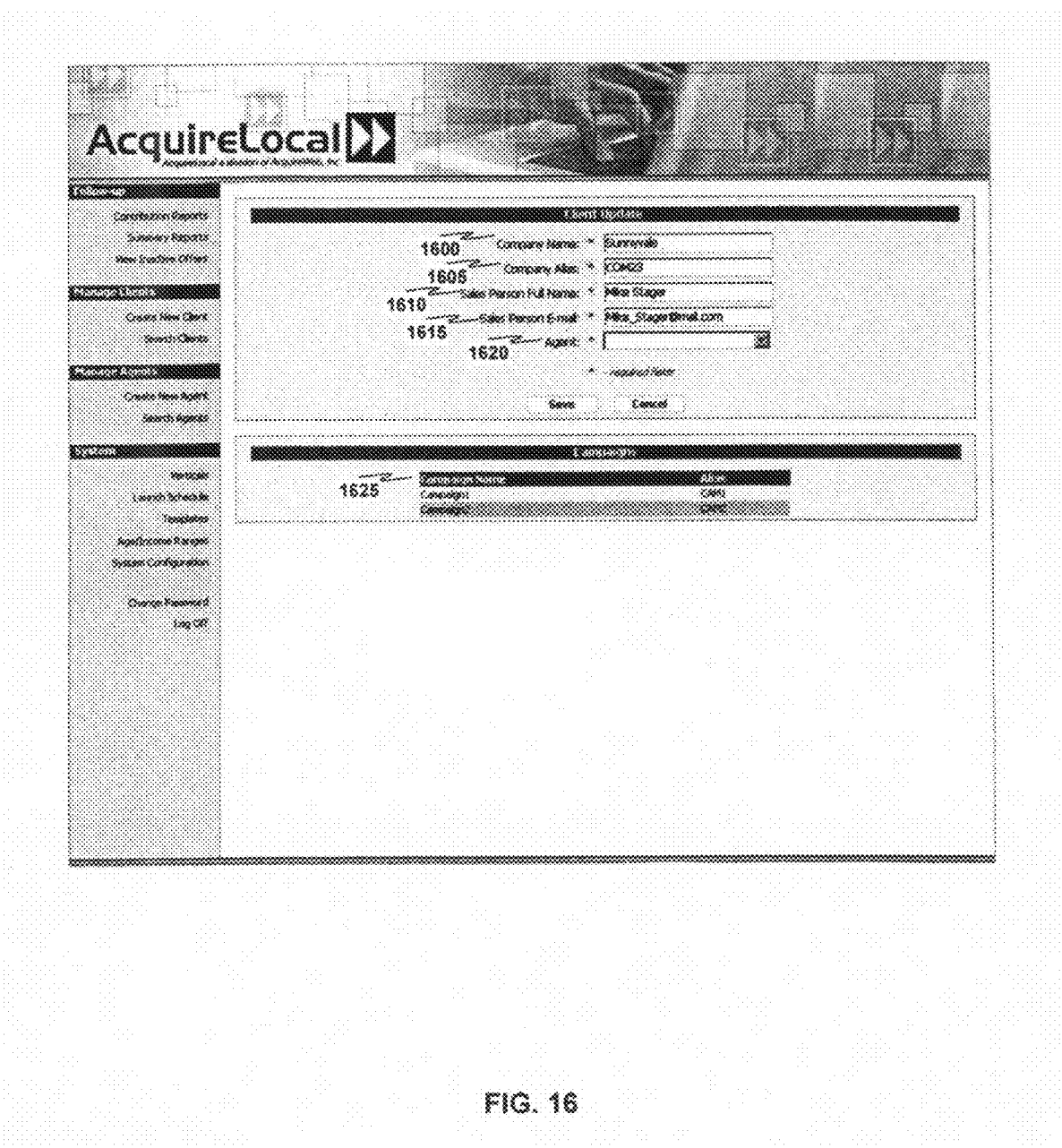
FIG. 16 is a screen shot that illustrates a user interface for customer acquisition, showing a client update in accordance with one embodiment of the present invention.

FIG. 16 is a screen shot that illustrates a user interface for customer acquisition, showing a client update in accordance with one embodiment of the present invention. Field 1600 indicates the company name of the client. Field 1605 indicates an alias associated with the company indicated at 1600. Field 1610 indicates the name of a sales person associated with the company. Field 1615 indicates an email address of the person identified at 1610. Field 1620 indicates an agent associated with the client identified at 1600. Campaigns associated with the client are indicated at 1625.

Figure 17:
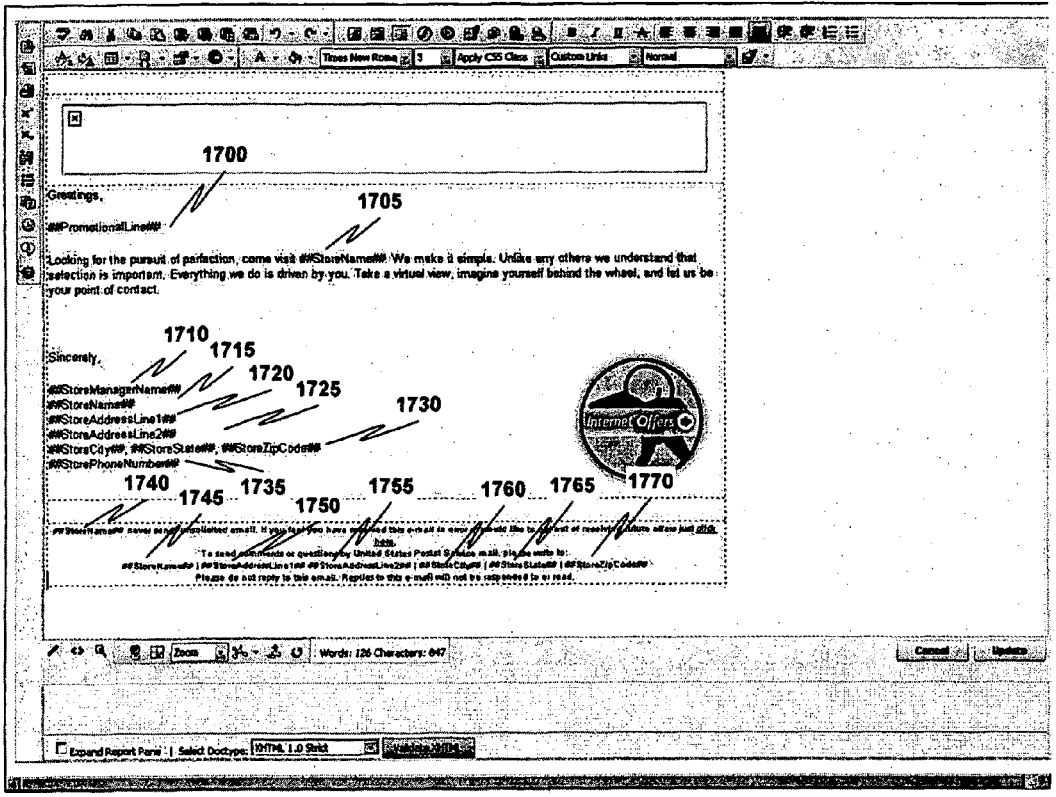
FIG. 17 is a screen shot that illustrates a user interface for customer acquisition, showing the editing of a landing page in accordance with one embodiment of the present invention.

FIG. 17 is a screen shot that illustrates a user interface for customer acquisition, showing the editing of a landing page in accordance with one embodiment of the present invention. The landing page shown in FIG. 17 includes placeholders 1700-1770 that are substituted with information specific to a particular campaign and a particular customer in the target audience.

Figure 18:
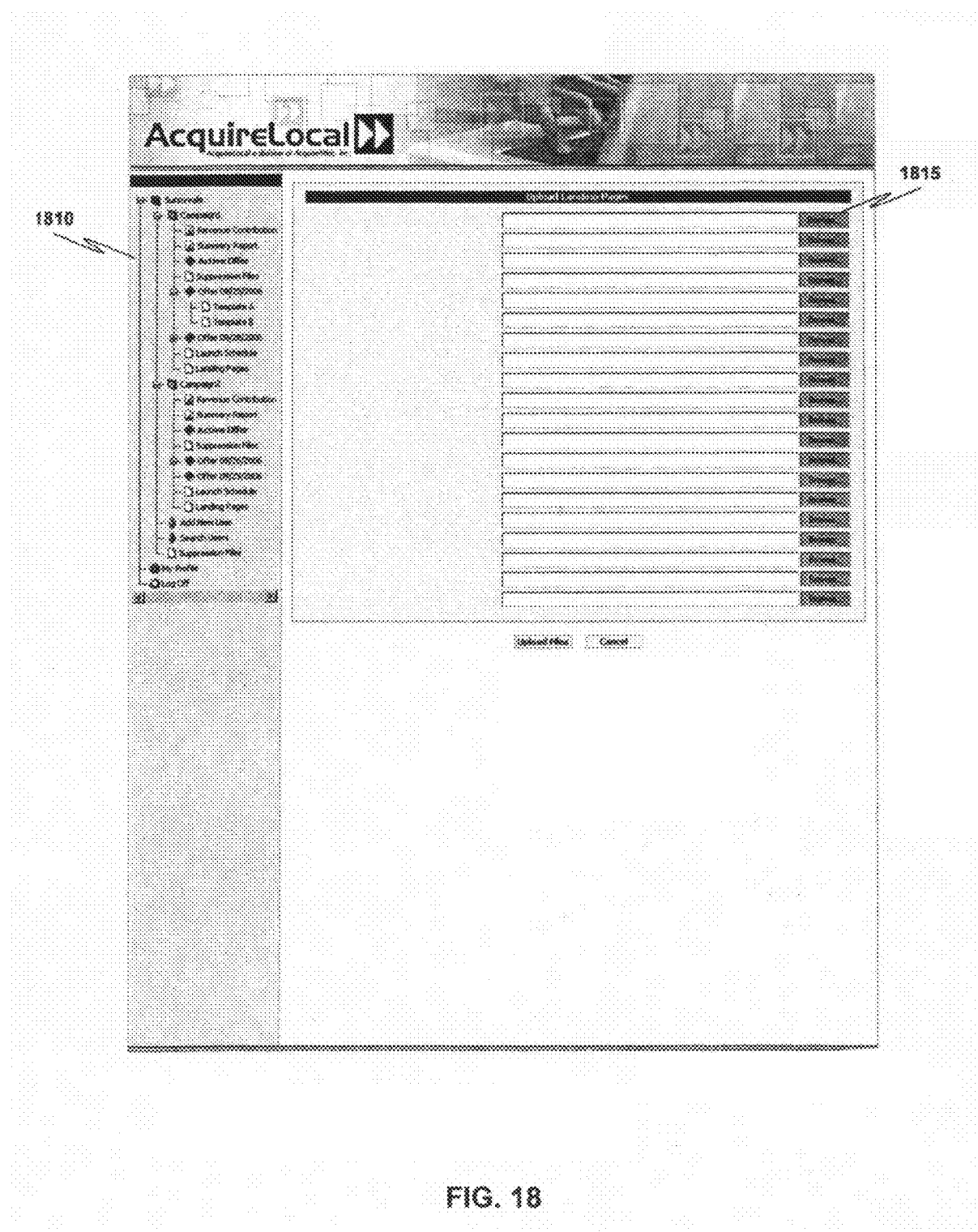
FIG. 18 is a screen shot that illustrates a user interface for customer acquisition, showing the upload of landing pages in accordance with one embodiment of the present invention.

FIG. 18 is a screen shot that illustrates a user interface for customer acquisition, showing the upload of landing pages in accordance with one embodiment of the present invention. Field 1815 indicates the location of a landing page to upload.

Figure 19:
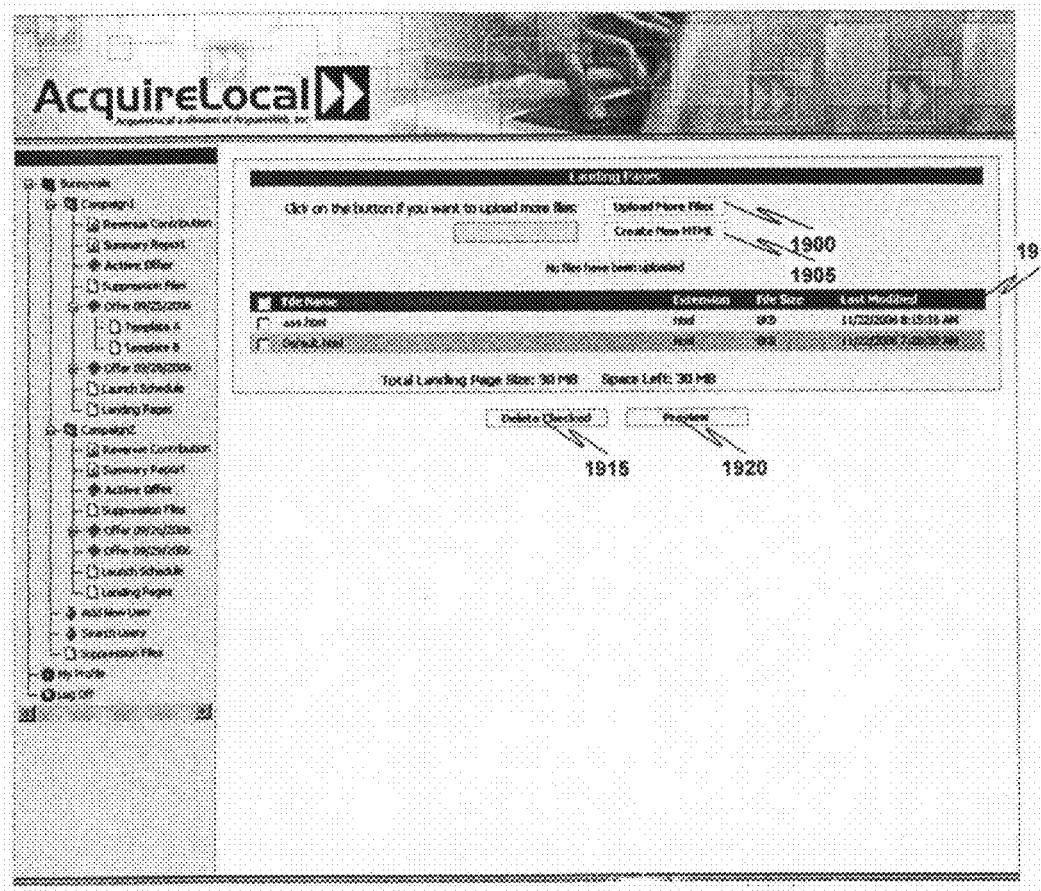
FIG. 19 is a screen shot that illustrates a user interface for customer acquisition, showing uploaded landing pages in accordance with one embodiment of the present invention.

FIG. 19 is a screen shot that illustrates a user interface for customer acquisition, showing uploaded landing pages in accordance with one embodiment of the present invention. Button 1900 may be used to initiate the uploading of additional landing pages. Button 1905 may be used to initiate the creation of new HTML code associated with a landing page. Information about uploaded landing pages is shown at 1910. The uploaded landing pages may be deleted (1915) or previewed (1920).

Figure 20:
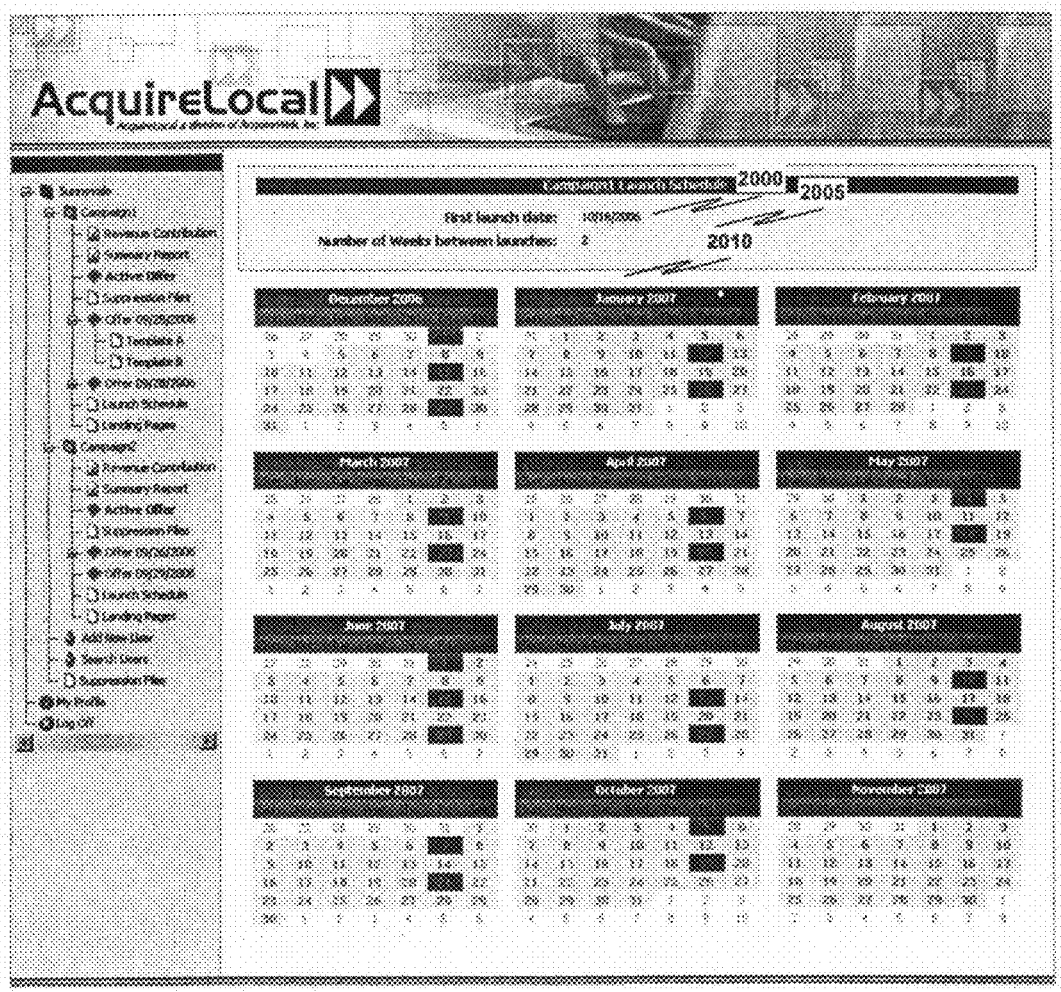
FIG. 20 is a screen shot that illustrates a user interface for customer acquisition, showing a campaign launch schedule in accordance with one embodiment of the present invention.

FIG. 20 is a screen shot that illustrates a user interface for customer acquisition, showing a campaign launch schedule in accordance with one embodiment of the present invention. Field 2000 indicates the first launch date of a campaign. Field 2005 indicates the number of weeks between launches in the campaign. Corresponding launch dates are highlighted in calendar 2010.

Figure 21:
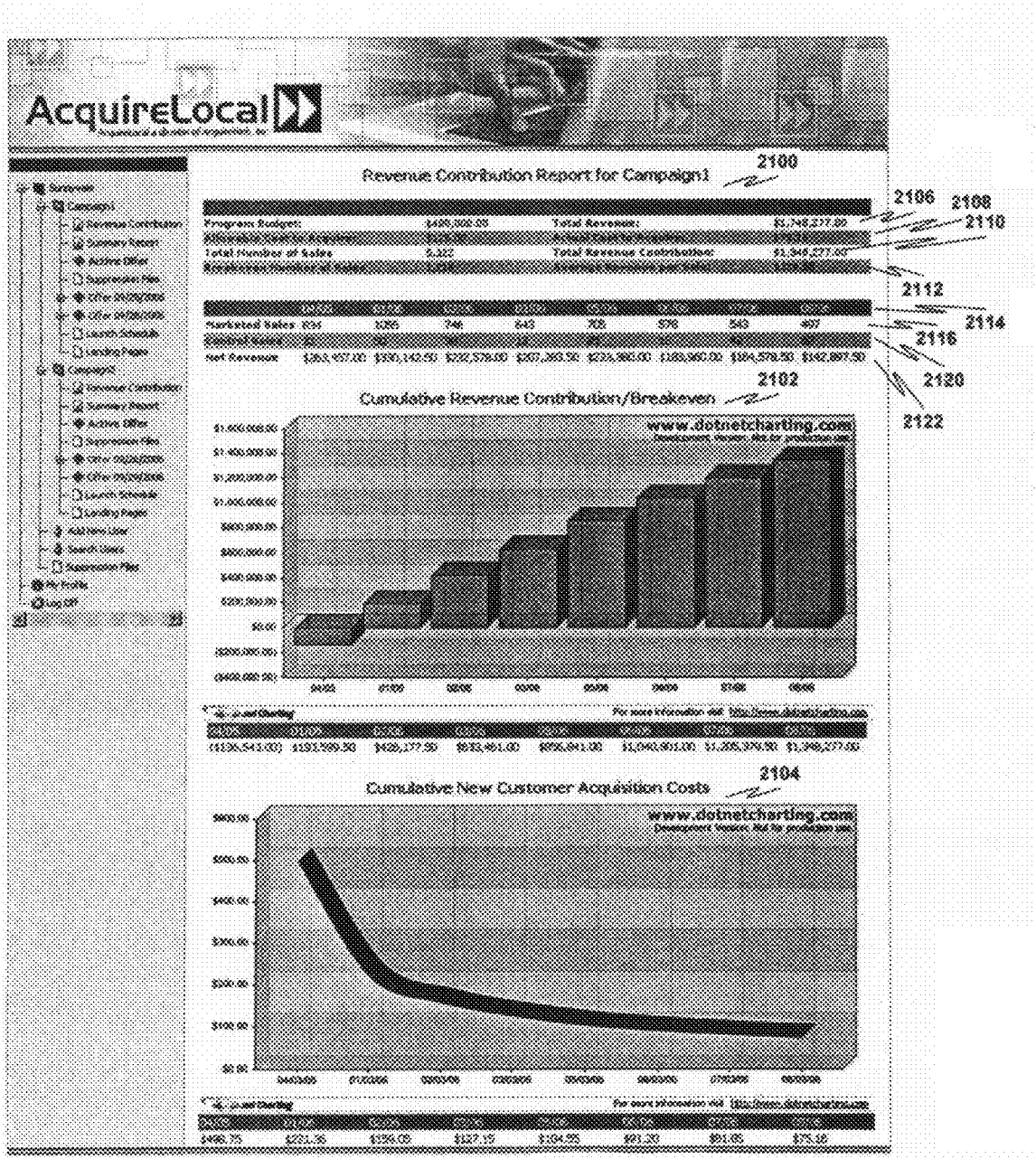
FIG. 21 is a screen shot that illustrates a user interface for customer acquisition, showing a revenue report in accordance with one embodiment of the present invention.

FIG. 21 is a screen shot that illustrates a user interface for customer acquisition, showing a revenue report in accordance with one embodiment of the present invention. FIG. 21 includes a revenue contribution report for a particular campaign 2100, a cumulative revenue contribution/breakeven report 2102, and a cumulative new customer acquisition costs report 2104.

Figure 22:
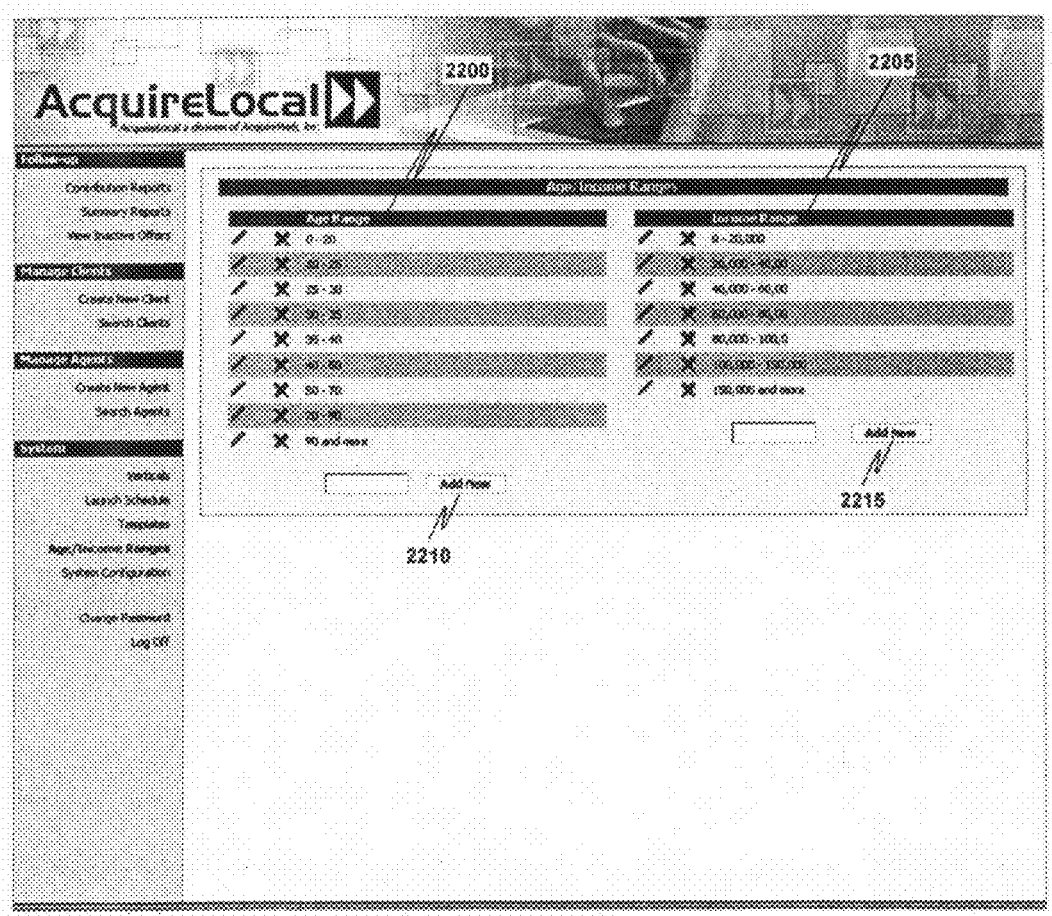
FIG. 22 is a screen shot that illustrates a user interface for customer acquisition, showing a selection setup in accordance with one embodiment of the present invention.

FIG. 22 is a screen shot that illustrates a user interface for customer acquisition, showing a selection setup in accordance with one embodiment of the present invention. FIG. 22 illustrates example parameters that may be configured on a system-wide basis. Many parameters other than age range and income range may be configured on a system-wide basis. The example parameters shown in FIG. 22 are age ranges 2200 for customers in a target audience and income ranges 2205 for customers in a target audience. A new age range may be added at 2210. A new income range may be added at 2215.

Figure 23:
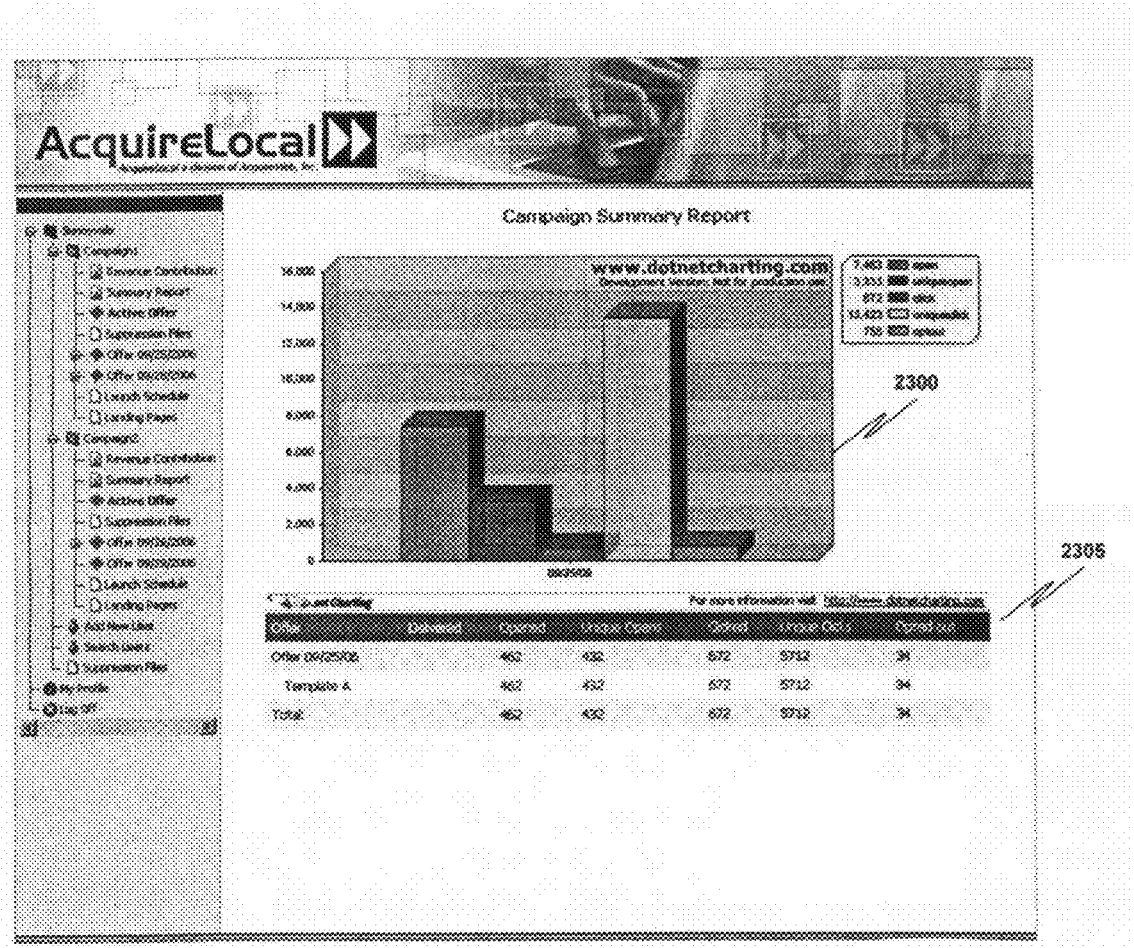
FIG. 23 is a screen shot that illustrates a user interface for customer acquisition, showing a summary report in accordance with one embodiment of the present invention.
Figure 24:
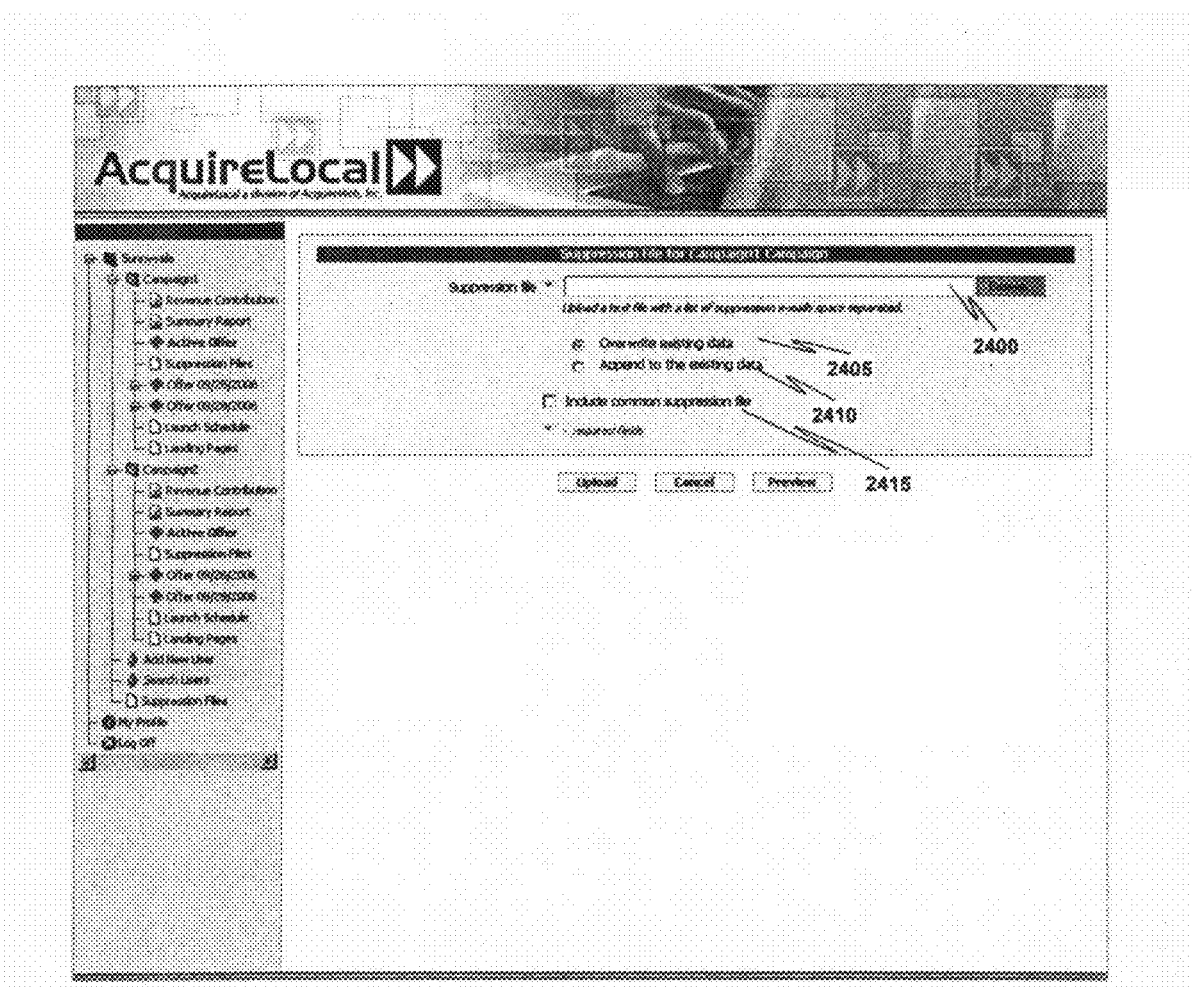
FIG. 24 is a screen shot that illustrates a user interface for customer acquisition, showing a suppression file for a campaign in accordance with one embodiment of the present invention.

FIG. 23 is a screen shot that illustrates a user interface for customer acquisition, showing a summary report in accordance with one embodiment of the present invention. Report 2300 includes a graphical depiction of:

1. the number of times an offer was opened;
2. the number of times an offer was opened by different individuals;
3. the number of times the landing page associated with an offer was clicked;
4. the number of times the landing page associated with an offer was clicked by different individuals; and
5. the number of individuals that opted out of receiving the offer FIG. 24 is a screen shot that illustrates a user interface for customer acquisition, showing a suppression file for a campaign in accordance with one embodiment of the present invention. Field 2400 indicates the location of a text file containing a list of email addresses that should not receive an offer. By way of example, the text file may comprise email addresses of employees that work for the company participating in a particular campaign.

Figure 25:
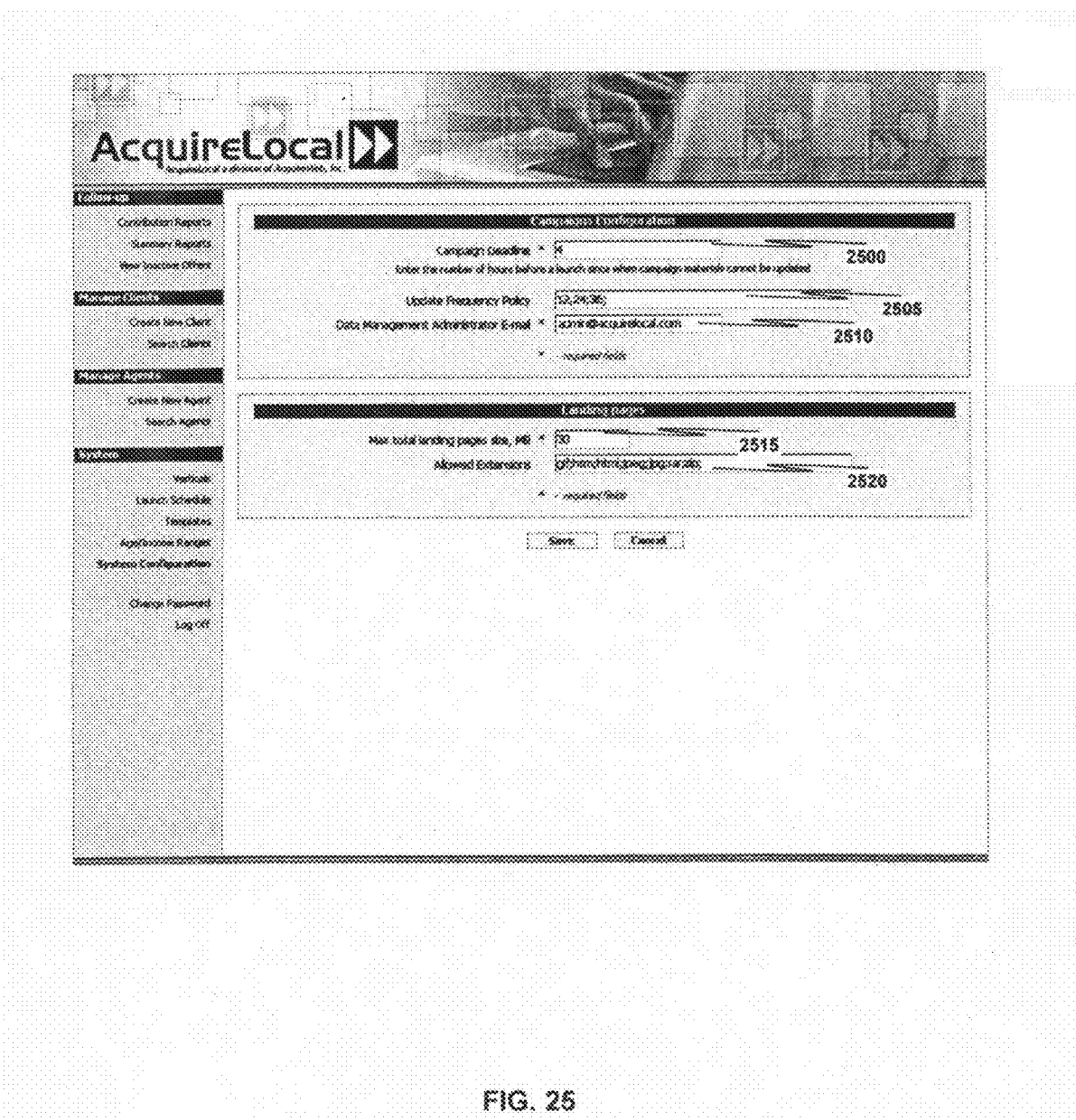
FIG. 25 is a screen shot that illustrates a user interface for customer acquisition, showing a system setup in accordance with one embodiment of the present invention.

FIG. 25 is a screen shot that illustrates a user interface for customer acquisition, showing a system setup in accordance with one embodiment of the present invention. Field 2500 indicates the number of hours before a launch when campaign materials cannot be updated. Field 2505 indicates an update frequency policy. In the example shown, "12;24;36" means updates are allowed every 12 hours. Field 2510 indicates the email address of the data management administrator for a particular campaign. Field 2515 indicates a maximum number of landing pages for a particular campaign. Field 2520 indicates allowed file extensions for landing pages for the campaign.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A computer implemented method for verticalized automated customer acquisition by a marketer, the method comprising:

by each of one or more clients within a market vertical,
determining one or more attributes of a target audience; and identifying one or more subscriptions comprising a predetermined number of individuals having the attributes, a template for the market vertical providing a framework for an offer;

by a permission requester module of the computer, requesting from each of the individuals permission to send one or more offers according to a campaign describing a series of offers to the individuals from clients within the market vertical;

by an acceptance receiver module of the computer, receiving one or more acceptances from at least one of the individuals responsive to the requesting; and by an offer sender module of the computer, sending the one or more offers to the at least one of the individuals according to the campaign.

2. The method of claim 1, further comprising excluding from the one or more subscriptions, all individuals previously identified by a different marketer, the marketer and the different marketer belonging to the same market vertical.

3. The method of claim 1 wherein the one or more attributes comprises a postal code.

4. The method of claim 3 wherein the postal code comprises a zip code.

5. The method of claim 1 wherein the one or more attributes comprises a radius to a location.

6. The method of claim 1 wherein the one or more attributes comprises an age range.

7. The method of claim 1 wherein the one or more attributes comprises an income range.

8. The method of claim 1 wherein the one or more attributes comprises a gender.

9. The method of claim 1 wherein the one or more attributes comprises a number of automobiles.

10. The method of claim 1 wherein the one or more attributes comprises a number of children.

11. The method of claim 1 wherein the one or more offers comprises one or more emailed offers.

12. The method of claim 11 wherein the one or more offers comprises a landing page.

13. The method of claim 1, further comprising generating one or more reports summarizing one or more results of the sending for a particular offer for different clients on a subscription level where the client sees only the results specific to their subscription or subscriptions.

14. The method of claim 13 wherein the report comprises an identification of the number of delivered offers for different clients on a subscription level where the client sees only the results specific to their subscription or subscriptions.

15. The method of claim 13 wherein the report comprises an identification of the number of opened offers for different clients on a subscription level where the client sees only the results specific to their subscription or subscriptions.

16. The method of claim 13 wherein the report comprises an identification of the number of unique opened offers for different clients on a subscription level where the client sees only the results specific to their subscription or subscriptions.

17. The method of claim 13 wherein the report comprises an identification of the number of individuals that opted out.

18. The method of claim 1 wherein the predetermined number of individuals is 20,000.

19. The method of claim 1 further comprising, after the sending, identifying a second one or more subscriptions comprising a predetermined number of individuals having the attributes.

20. The method of claim 1 further comprising, after the identifying, prohibiting the dropping of the one or more subscriptions.

21. A program storage device readable by a machine, embodying a program of instructions executable by the machine to perform a method for verticalized automated customer acquisition by a marketer, the method comprising:

by each of one or more clients within a market vertical,
determining one or more attributes of a target audience; and identifying one or more subscriptions comprising a predetermined number of individuals having the attributes, a template for the market vertical providing a framework for an offer;

by a permission requester module of the computer, requesting from each of the individuals permission to send one or more offers according to a campaign describing a series of offers to the individuals from clients within the market vertical;

by an acceptance receiver module of the computer, receiving one or more acceptances from at least one of the individuals responsive to the requesting; and by an offer sender module of the computer, sending the one or more offers to the at least one of the individuals according to the campaign.

22. The program storage device of claim 21, the method further comprising excluding from the one or more subscriptions, all individuals previously identified by a different marketer, the marketer and the different marketer belonging to the same market vertical.

23. The program storage device of claim 21 wherein the one or more attributes comprises a postal code.

24. The program storage device of claim 23 wherein the postal code comprises a zip code.

25. The program storage device of claim 21 wherein the one or more attributes, comprises a radius to a location.

26. The program storage device of claim 21 wherein the one or more attributes comprises an age range.

27. The program storage device of claim 21 wherein the one or more attributes comprises an income range.

28. The program storage device of claim 21 wherein the one or more attributes comprises a gender.

29. The program storage device of claim 21 wherein the one or more attributes comprises a number of automobiles.

30. The program storage device of claim 21 wherein the one or more attributes comprises a number of children.

31. The program storage device of claim 21 wherein the one or more offers comprises one or more mailed offers.

32. The program storage device of claim 31 wherein the one or more offers comprises a landing page.

33. The program storage device of claim 21, the method further comprising generating one or more reports summarizing one or more results of the sending for a particular offer of a marketer.

34. The program storage device of claim 33 wherein the report comprises an identification of the number of delivered offers for different clients on a subscription level where the client sees only the results specific to their subscription or subscriptions.

35. The program storage device of claim 33 wherein the report comprises an identification of the number of opened offers for different clients on a subscription level where the client sees only the results specific to their subscription or subscriptions.

36. The program storage device of claim 33 wherein the report comprises an identification of the number of unique opened offers for different clients on a subscription level where the client sees only the results specific to their subscription or subscriptions.

37. The program storage device of claim 33 wherein the report comprises an identification of the number of individuals that opted out different clients on a subscription level where the client sees only the results specific to their subscription or subscriptions.

38. The program storage device of claim 21 wherein the predetermined number of individuals is 20,000.

39. The program storage device of claim 21, the method further comprising, after the sending, identifying a second one or more subscriptions comprising a predetermined number of individuals having the attributes.

40. The program storage device of claim 21, the method further comprising, after the identifying, prohibiting the dropping the one or more subscriptions.

41. An apparatus for verticalized automated customer acquisition by a marketer, the apparatus comprising:
   a memory;
   one or more processors;
   means for, by each of one or more clients within a market vertical,
      determining one or more attributes of a target audience; and
      identifying one or more subscriptions comprising a predetermined number of individuals having the attributes, a template for the market vertical providing a framework for an offer;
   means for requesting from each of the individuals permission to send one or more offers according to a campaign describing a series of offers to the individuals from clients within the market vertical;
   means for receiving one or more acceptances from at least one of the individuals responsive to the requesting; and
   means for sending the one or more offers to the at least one of the individuals according to the campaign.

42. The apparatus of claim 41, further comprising means for excluding from the one or more subscriptions, all individuals previously identified by a different marketer, the marketer and the different marketer belonging to the same market vertical.

43. The apparatus of claim 41 wherein the one or more attributes comprises a postal code.

44. The apparatus of claim 43 wherein the postal code comprises a zip code.

45. The apparatus of claim 41 wherein the one or more attributes comprises a radius to a location.

46. The apparatus of claim 41 wherein the one or more attributes comprises an age range.

47. The apparatus of claim 41 wherein the one or more attributes comprises an income range.

48. The apparatus of claim 41 wherein the one or more attributes comprises a gender.

49. The apparatus of claim 41 wherein the one or more attributes comprises a number of automobiles.

50. The apparatus of claim 41 wherein the one or more attributes comprises a number of children.

51. The apparatus of claim 41 wherein the one or more offers comprises one or more emailed offers.

52. The apparatus of claim 51 wherein the one or more offers comprises a landing page.

53. The apparatus of claim 41, further comprising means for generating one or more reports summarizing one or more results of the sending for a particular offer of a marketer.

54. The apparatus of claim 53 wherein the report comprises an identification of the number of delivered offers for different clients on a subscription level where the client sees only the results specific to their subscription or subscriptions.

55. The apparatus of claim 53 wherein the report comprises an identification of the number of opened offers for different clients on a subscription level where the client sees only the results specific to their subscription or subscriptions.

56. The apparatus of claim 53 wherein the report comprises an identification of the number of unique opened offers for different clients on a subscription level where the client sees only the results specific to their subscription or subscriptions.

57. The apparatus of claim 53 wherein the report comprises an identification of the number of individuals that opted out for different clients on a subscription level where the client sees only the results specific to their subscription or subscriptions.

58. The apparatus of claim 41 wherein the predetermined-number of individuals is 20,000.

59. The apparatus of claim 41 further comprising means for, after the sending, identifying a second one or more subscriptions comprising a predetermined number of individuals having the attributes.

60. The apparatus of claim 41 further comprising means for, after the identifying, prohibiting the dropping the one or more subscriptions.

61. An apparatus for verticalized automated customer acquisition by a marketer, the apparatus comprising:
   a memory; and
   one or more processors configured to:
      for each of one or more clients within a market vertical,
         determine one or more attributes of a target audience; and
         identify one or more subscriptions comprising a predetermined number of individuals having the attributes, a template for the market vertical providing a framework for an offer;
      request from each of the individuals permission to send one or more offers according to a campaign describing a series of offers to the individuals from clients within the market vertical;
      receive one or more acceptances from at least one of the individuals in response to the requesting; and
      send the one or more offers to the at least one of the individuals according to the campaign.

62. The apparatus of claim 61 wherein the subscription identifier is further configured to exclude from the one or more subscriptions, all individuals previously identified by a different marketer, the marketer and the different marketer belonging to the same market vertical.

63. The apparatus of claim 61 wherein the one or more attributes comprises a postal code.

64. The apparatus of claim 63 wherein the postal code comprises a zip code.

65. The apparatus of claim 61 wherein the one or more attributes comprises a radius to a location.

66. The apparatus of claim 61 wherein the one or more attributes comprises an age range.

67. The apparatus of claim 61 wherein the one or more attributes comprises an income range.

68. The apparatus of claim 61 wherein the one or more attributes comprises a gender.

69. The apparatus of claim 61 wherein the one or more attributes comprises a number of automobiles.

70. The apparatus of claim 61 wherein the one or more attributes comprises a number of children.

71. The apparatus of claim 61 wherein the one or more offers comprises one or more emailed offers.

72. The apparatus of claim 71 wherein the one or more offers comprises a landing page.

73. The apparatus of claim 61, further comprising a report generator coupled to the offer sender and configured to generate one or more reports summarizing one or more results of the sending for a particular offer of a marketer.

74. The apparatus of claim 73 wherein the report comprises an identification of the number of delivered offers for different clients on a subscription level where the client sees only the results specific to their subscription or subscriptions.

75. The apparatus of claim 73 wherein the report comprises an identification of the number of opened offers for different clients on a subscription level where the client sees only the results specific to their subscription or subscriptions.

76. The apparatus of claim 73 wherein the report comprises an identification of the number of unique opened offers for different clients on a subscription level where the client sees only the results specific to their subscription or subscriptions.

77. The apparatus of claim 73 wherein the report comprises an identification of the number of individuals that opted out for different clients on a subscription level where the client sees only the results specific to their subscription or subscriptions.

78. The apparatus of claim 61 wherein the predetermined number of individuals is 20,000.

79. The apparatus of claim 61 wherein the apparatus is further configured to, after the sending, identify a second one or more subscriptions comprising a predetermined number of individuals having the attributes.

80. The apparatus of claim 61 wherein the apparatus is further configured to further to, after the identifying, prohibit the dropping of the one or more subscriptions.

\* \* \* \* \*